US008760990B2

(12) United States Patent
Tanaka et al.

(10) Patent No.: US 8,760,990 B2
(45) Date of Patent: Jun. 24, 2014

(54) OBJECTIVE LENS FOR OPTICAL PICKUP APPARATUS, OPTICAL PICKUP APPARATUS, AND OPTICAL INFORMATION RECORDING REPRODUCING APPARATUS

(75) Inventors: Hideki Tanaka, Fuchu (JP); Kentarou Nakamura, Nakano-ku (JP); Kiyono Tateyama, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 13/884,890

(22) PCT Filed: Nov. 9, 2011

(86) PCT No.: PCT/JP2011/075780
§ 371 (c)(1),
(2), (4) Date: May 10, 2013

(87) PCT Pub. No.: WO2012/063847
PCT Pub. Date: May 18, 2012

(65) Prior Publication Data
US 2013/0229902 A1    Sep. 5, 2013

(30) Foreign Application Priority Data

Nov. 10, 2010 (JP) ................................. 2010-251765
May 31, 2011 (JP) ................................. 2011-121668

(51) Int. Cl.
*G11B 7/00* (2006.01)
(52) U.S. Cl.
USPC ................................. 369/112.23; 369/112.08
(58) Field of Classification Search
None
See application file for complete search history.

(56) References Cited

U.S. PATENT DOCUMENTS

| 2003/0039033 | A1* | 2/2003  | Takeuchi et al. ............... 359/566 |
| 2007/0211607 | A1* | 9/2007  | Nakamura et al. ........ 369/112.25 |
| 2008/0013415 | A1* | 1/2008  | Nomura et al. ............ 369/44.23 |
| 2009/0103419 | A1* | 4/2009  | Nakamura et al. ........ 369/112.01 |
| 2009/0245075 | A1* | 10/2009 | Komma et al. ........... 369/112.23 |
| 2010/0284259 | A1* | 11/2010 | Nakamura ............... 369/112.03 |
| 2010/0284261 | A1* | 11/2010 | Nakamura ............... 369/112.23 |
| 2010/0322060 | A1* | 12/2010 | Yasui ...................... 369/112.03 |
| 2011/0085433 | A1* | 4/2011  | Takada et al. ............ 369/112.23 |

FOREIGN PATENT DOCUMENTS

| JP | 2009-9674      | 1/2009  |
| WO | WO 2007/145202 | 12/2007 |
| WO | WO 2009/147827 | 12/2009 |
| WO | WO 2010/071125 | 6/2010  |

* cited by examiner

*Primary Examiner* — Thang Tran
(74) *Attorney, Agent, or Firm* — Cozen O'Connor

(57) ABSTRACT

An optical pickup apparatus including an objective lens capable of enhancing temperature characteristics and wavelength characteristics, and which enables compatibility for three types of optical discs of BDs, DVDs, and CDs by using the objective lens in common, an optical information recording and reproducing apparatus, and an objective lens suitable for it. In a first optical path difference providing structure in which at least a first basic structure and a second basic structure are superimposed on each other, an amount of a level difference in an optical axis direction can be reduced, whereby it becomes possible to suppress the lowering of a diffraction efficiency when wavelength changes. Further, in the first basic structure and the second basic structure deterioration of the spherical aberration due to the change of the refractive index of the objective lens can be corrected by utilizing a phenomenon that the wavelength of the light source rises similarly due to a rise in the environmental temperature.

13 Claims, 6 Drawing Sheets

(a) (b)

OPTICAL AXIS OA (a) (b)

OPTICAL AXIS OA

OBJECTIVE LENS FOR OPTICAL PICKUP APPARATUS, OPTICAL PICKUP APPARATUS, AND OPTICAL INFORMATION RECORDING REPRODUCING APPARATUS

RELATED APPLICATIONS

This is a U.S. national stage of International application No. PCT/JP2011/075780 filed on Nov. 9, 2011.

This patent application claims the priority of Japanese application no. 2010-251765 filed Nov. 10, 2010 and 2011-121668 filed May 31, 2011, the disclosure content of both of which are hereby incorporated by reference.

TECHNICAL FIELD

The present invention relates to an optical pickup apparatus which can perform recording and/or reproducing (recording/reproducing) information with compatibility for different types of optical discs, to an objective lens, and to an optical information recording reproducing apparatus.

BACKGROUND ART

In recent years, in such an optical pickup apparatuses equipped with a laser light source used as a light source for reproducing information recorded in an optical disc and for recording information for an optical disc, a trend to shorten the wavelength of the laser light source has been advanced. For example, a laser light source with a wavelength of 390 to 420 nm, such as a blue-violet semiconductor laser, has been put in practical use. In the case of using an objective lens with the same numerical aperture (NA) with that for DVDs (Digital Versatile Disc), the employment of such a blue-violet semiconductor laser light source enables to record the information of 15 to 20 GB for an optical disc with a diameter of 12 cm. Further, in the case where the NA of an objective lens is increased to 0.85, it becomes possible to record the information of 23 to 25 GB for an optical disc with a diameter of 12 cm.

Examples of optical discs designed for use with the above-mentioned objective lens with an NA of 0.85, include BDs (Blue-ray Disc). Since a comma aberration occurring due to the inclination (skew) of an optical disc increases, the protective substrate of the BD is designed to be thinner (0.1 mm in contrast with 0.6 mm of a DVD) than that of the DVD, thereby reducing the comma aberration due to the skew.

Incidentally, only a performance capable of recording and/or reproducing information properly for BDs is not said to have sufficient commercial value as products of optical disc players/recorders (optical information recording reproducing apparatus). In consideration of a fact that, at present, DVDs and CDs (Compact Discs) storing various kinds of information have been on the market, only the performance capable of recording and/or reproducing information for BDs is not sufficient. For example, a performance capable of enabling to record and/or reproduce information properly also for DVDs and CDs possessed by users leads to enhance the commercial value as optical disc players/recorders for BDs. In view of such a background, optical pickup apparatuses installed in optical disc players/recorders used for BDs are required to have a performance capable of recording and/or reproducing information appropriately while maintaining compatibility for any one of BDs and DVDs and further CDs.

As a method capable of recording and/or reproducing information appropriately while maintaining compatibility for any one of BDs and DVDs and further CDs, a supposable method is to switch over selectively an optical system for BDs and an optical system for DVDs and CDs in response to the recording density of an optical disc for which information is recorded or reproduced. However, according to this method, a plurality of optical systems is needed, which is not advantageous in terms of miniaturization and leads to increase cost.

Accordingly, in order to simplify the structure of an optical pickup apparatus and to realize the reduction of cost, even in an optical pickup apparatus with compatibility, it is preferable to make an optical system for BDs and an optical system for DVDs and CDs into a common optical system so as to reduce the number of optical components constituting the optical pickup apparatus as much as possible. Therefore, a technique to make an objective lens to be arranged so as to face an optical disc into a common objective lens for each of optical discs different in type is the most advantageous for the simplification of the structure and for the reduction of cost for the optical pickup apparatus. In order to realize such a common objective lens for multiple types of optical discs designed for use with respective different wavelengths for recording and/or reproducing information, it is required to form a diffractive structure having wavelength dependency for a spherical aberration on an objective lens.

Patent Document 1 discloses an objective lens which includes a structure in which two basic structures with respective diffractive structures are superimposed on each other and can be used in common for three types of optical discs, and also discloses an optical pickup apparatus in which this objective lens is mounted.

Two of the three types of optical disc disclosed in Patent Document 1 are apparently DVDs and CDs. Further, with reference to examples, an NA is made 0.67 (NA=0.67) for a wavelength of 405 nm. That is, Patent Document 1 is said to be an application which places a weight on compatibility for three types of optical discs of HD-DVDs, DVDs, and CDs. The inventor studied the applicability of the examples of this application for the compatibility for three types of optical disc of BDs, DVDs, and CDs. As a result, it turned out that since the NA of BDs is generally 0.85 being a high NA as compared with HD-DVDs, a spherical aberration becomes large due to a change in the refractive index of an objective lens when temperature changes. Further, it also turned out that in the superimposition structure disclosed by Patent Document 1 in which diffractive structures are superimposed on each other, since the amount of a level difference in stepped portions in the optical axis direction increases, when wavelength changes, large fluctuation of diffraction efficiency tends to occur.

RELATED TECHNICAL DOCUMENT

Patent Document

Patent Document 1: U.S. Pat. No. 4,562,645 Specification

DISCLOSURE OF INVENTION

Problems to be Solved by Invention

The present invention has an object to solve the above-mentioned problems, and the object is to provide an optical pickup apparatus which includes an objective lens capable of enhancing temperature characteristics and suppressing the fluctuation of diffraction efficiency when wavelength changes and enables compatibility for three types of optical discs of BDs, DVDs, and CDs by using the objective lens in common, and to provide an optical information recording and reproducing apparatus and an objective lens suitable for the optical pickup apparatus.

Solution to Problems

An objective lens described in claim 1 is configured to be used for an optical pickup apparatus which comprises a first light source for emitting a first light flux having a first wavelength $\lambda 1$ (390 nm≤$\lambda 1$≤415 nm), a second light source for emitting a second light flux having a second wavelength $\lambda 2$ (630 nm≤$\lambda 2$≤670 nm), and a third light source for emitting a third light flux having a third wavelength $\lambda 3$ (760 nm≤$\lambda 3$≤820 nm). The optical pickup apparatus is configured to record and/or reproduce information for a BD including a protective substrate with a thickness t1 by using the first light flux, to record and/or reproduce information for a DVD including a protective substrate with a thickness t2 (t1<t2) by using the second light flux, and to record and/or reproduce information for a CD including a protective substrate with a thickness t3 (t2<t3) by using the third light flux. The objective lens is a single lens made of plastic and has an optical surface including at least a central region, an intermediate region surrounding the central region, and a peripheral region surrounding the intermediate region. The central region includes a first optical path difference providing structure and the intermediate region includes a second optical path difference providing structure. The objective lens is configured to converge the first light flux passing through the central region onto the information recording surface of the BD so as to enable to record and/or reproduce information, to converge the second light flux passing through the central region onto the information recording surface of the DVD so as to enable to record and/or reproduce information, and to converge the third light flux passing through the central region onto the information recording surface of the CD so as to enable to record and/or reproduce information. Further, the objective lens is configured to converge the first light flux passing through the intermediate region onto the information recording surface of the BD so as to enable to record and/or reproduce information, to converge the second light flux passing through the intermediate region onto the information recording surface of the DVD so as to enable to record and/or reproduce information, and not to converge the third light flux passing through the intermediate region onto the information recording surface of the CD so as to enable to record and/or reproduce information. Furthermore, the objective lens is configured to converge the first light flux passing through the peripheral region onto the information recording surface of the BD so as to enable to record and/or reproduce information, not to converge the second light flux passing through the peripheral region onto the information recording surface of the DVD so as to enable to record and/or reproduce information, and not to converge the third light flux passing through the peripheral region onto the information recording surface of the CD so as to enable to record and/or reproduce information. The first optical path difference providing structure has a structure in which at least a first basic structure and a second basic structure are superimposed on each other. The first basic structure is configured to make a light quantity of the first order diffracted light flux of the first light flux having passed through the first basic structure larger than a light quantity of any other order diffracted light flux, to make a light quantity of the first order diffracted light flux of the second light flux having passed through the first basic structure larger than a light quantity of any other order diffracted light flux, and to make a light quantity of the first order diffracted light flux of the third light flux having passed through the first basic structure larger than a light quantity of any other order diffracted light flux, and the first basic structure is a blaze type structure. The second basic structure is configured to make a light quantity of the second order diffracted light flux of the first light flux having passed through the second basic structure larger than a light quantity of any other order diffracted light flux, to make a light quantity of the first order diffracted light flux of the second light flux having passed through the second basic structure larger than a light quantity of any other order diffracted light flux, and to make a light quantity of the first order diffracted light flux of the third light flux having passed through the second basic structure larger than a light quantity of any other order diffracted light flux, and the second basic structure is a blaze type structure. Moreover, in the first basic structure, when the wavelength of an entering light flux (an incident light flux) changes to become longer, a spherical aberration changes in a deficient correction direction, and in the second basic structure, when the wavelength of an entering light flux changes to become longer, a spherical aberration changes in a deficient correction direction.

As a result of diligent study, the inventor found out that with the first optical path difference providing structure having a structure in which at least a first basic structure and a second basic structure are superimposed on each other, wherein the first basic structure is configured to make a light quantity of the first order diffracted light flux of the first light flux having passed through the first basic structure larger than a light quantity of any other order diffracted light flux, to make a light quantity of the first order diffracted light flux of the second light flux having passed through the first basic structure larger than a light quantity of any other order diffracted light flux, and to make a light quantity of the first order diffracted light flux of the third light flux having passed through the first basic structure larger than a light quantity of any other order diffracted light flux, and the first basic structure is a blaze type structure, and wherein the second basic structure is configured to make a light quantity of the second order diffracted light flux of the first light flux having passed through the second basic structure larger than a light quantity of any other order diffracted light flux, to make a light quantity of the first order diffracted light flux of the second light flux having passed through the second basic structure larger than a light quantity of any other order diffracted light flux, and to make a light quantity of the first order diffracted light flux of the third light flux having passed through the second basic structure larger than a light quantity of any other order diffracted light flux, and the second basic structure is a blaze type structure; an amount of a level difference in stepped portions in an optical axis direction can be reduced in the first optical path difference providing structure in which at least the first basic structure and the second basic structure are superimposed on each other, whereby it becomes possible to suppress the lowering of a diffraction efficiency when wavelength changes.

As a result of further diligent study, the inventor found out that with the configuration in which in the first basic structure and the second basic structure, when the wavelength of an entering light flux changes to become longer, a spherical aberration changes in a deficient correction direction; when the refractive index of the objective lens changes due to a rise in the temperature of the optical pickup apparatus, a change of the spherical aberration due to the change of the refractive index of the objective lens is corrected by utilizing a phenomenon that the wavelength of the light source rises similarly due to a rise in the temperature, whereby a proper converged-light spot can be formed on the information recording surface of each optical disc. With this, in the case where an objective lens is especially made of plastic, it becomes possible to provide an objective lens which can maintain stable performances even when temperature changes.

Here, since the term "first order diffracted light flux" in claims is not limited in terms of diffraction direction, the actual diffracted light flux includes both of a + first order diffracted light flux and a − first order diffracted light flux. In this connection, with regard to signs (±), respective diffracted light fluxes of the first light flux, the second light flux, and the third light flux generated in the same basic structure have the same sign to each other.

The objective lens described in claim 2 is configured in the invention described in claim 1 such that the stepped portions of at least a part of the first basic structure arranged in the vicinity of an optical axis on the central region face in a direction reverse to a direction going to the optical axis, and the stepped portions of at least a part of the second basic structure arranged in the vicinity of an optical axis on the central region face in a direction going to the optical axis.

With this, an amount of a level difference in the stepped portions in the optical axis direction can be reduced more in the first optical path difference providing structure in which the first basic structure and the second basic structure are superimposed on each other, whereby it becomes possible to suppress more the lowering of a diffraction efficiency when wavelength changes.

The objective lens described in claim 3 is configured in the invention described in claim 1 or 2 such that the second optical path difference providing structure has a structure in which at least a third basic structure and a fourth basic structure are superimposed on each other. The third basic structure is configured to make a light quantity of the first order diffracted light flux of the first light flux having passed through the third basic structure larger than a light quantity of any other order diffracted light flux, and to make a light quantity of the first order diffracted light flux of the second light flux having passed through the third basic structure larger than a light quantity of any other order diffracted light flux, and the third basic structure is a blaze type structure. The fourth basic structure is configured to make a light quantity of the second order diffracted light flux of the first light flux having passed through the fourth basic structure larger than a light quantity of any other order diffracted light flux, and to make a light quantity of the first order diffracted light flux of the second light flux having passed through the fourth basic structure larger than a light quantity of any other order diffracted light flux, and the fourth basic structure is a blaze type structure.

With this, an amount of a level difference in the stepped portions in the optical axis direction can be reduced in the second optical path difference providing structure in which at least the third basic structure and the fourth basic structure are superimposed on each other, whereby it becomes possible to suppress the lowering of a diffraction efficiency when wavelength changes. Further, the diffraction order of diffracted light flux having the highest light intensity in the first basic structure conforms to the diffraction order of diffracted light flux having the highest light intensity in the third basic structure, and the diffraction order of diffracted light flux having the highest light intensity in the second basic structure conforms to the diffraction order of diffracted light flux having the highest light intensity in the fourth basic structure. Accordingly, the spherical aberration of the light fluxes passing through both the central region and the intermediate region can be made continuous. As a result, it becomes possible to suppress the occurrence of a high order aberration when temperature or wavelength changes.

The objective lens described in claim 4 is configured in the invention described in claim 1 or 2 such that the second optical path difference providing structure has a structure in which at least a third basic structure and a fourth basic structure are superimposed on each other. The third basic structure is configured to make a light quantity of the third order diffracted light flux of the first light flux having passed through the third basic structure larger than a light quantity of any other order diffracted light flux, and to make a light quantity of the second order diffracted light flux of the second light flux having passed through the third basic structure larger than a light quantity of any other order diffracted light flux, and the third basic structure is a blaze type structure. The fourth basic structure is configured to make a light quantity of the second order diffracted light flux of the first light flux having passed through the fourth basic structure larger than a light quantity of any other order diffracted light flux, and to make a light quantity of the first order diffracted light flux of the second light flux having passed through the fourth basic structure larger than a light quantity of any other order diffracted light flux, and the fourth basic structure is a blaze type structure.

With this, since the diffraction efficiency in the BD can be enhanced, in the case where a large quantity of light is needed in the BD, it is preferable to employ this structure.

The objective lens described in claim 5 is configured in the invention described in claim 3 or 4 such that the stepped portions of at least a part of the third basic structure arranged in the vicinity of a boundary between the central region and the intermediate region on the intermediate region face in a direction reverse to a direction going to the optical axis, and the stepped portions of at least a part of the fourth basic structure arranged in the vicinity of a boundary between the central region and the intermediate region on the intermediate region face in a direction going to the optical axis.

With this, an amount of a level difference in the stepped portions in the optical axis direction can be reduced more in the second optical path difference providing structure in which the third basic structure and the fourth basic structure are superimposed on each other, whereby it becomes possible to suppress more the lowering of a diffraction efficiency when wavelength changes.

The objective lens described in claim 6 is configured in the invention described in any one of claims 3 to 5 such that in the third basic structure, when the wavelength of an entering light flux changes to become longer, a spherical aberration changes in a deficient correction direction, and in the fourth basic structure, when the wavelength of an entering light flux changes to become longer, a spherical aberration changes in a deficient correction direction.

With this, even in the second optical path difference providing structure in which at least the third basic structure and the fourth basic structure are superimposed on each other, when the refractive index of the objective lens changes due to a rise in the temperature of the optical pickup apparatus, the deterioration of the spherical aberration due to the change of the refractive index of the objective lens is corrected by utilizing a phenomenon that the wavelength of the light source rises similarly due to a rise in the environmental temperature, whereby a more proper converged-light spot can be formed on the information recording surface of each optical disc when the environmental temperature changes.

The objective lens described in claim 7 is configured in the invention described in any one of claims 3 to 5 such that in one of the third basic structure and the fourth basic structure, when the wavelength of an entering light flux changes to become longer, a spherical aberration changes in a deficient correction direction, and in the other one, when the wavelength of an entering light flux changes to become longer, a spherical aberration changes in an excessive correction direction.

In this case, in one of the third basic structure and the fourth basic structure, when the wavelength of an entering light flux changes to become longer, a spherical aberration changes in an excessive correction direction. Accordingly, even if the second optical path difference providing structure consists of only the third basic structure and the fourth basic structure, it becomes possible to achieve easily to form flare at the time of use of the CD. Accordingly, since the formation of flare at the time of use of the CD can be achieved by the second optical path difference providing structure with a simple configuration, it becomes possible to suppress the lowering of light utilization efficiency due to a shadow effect, and further also to suppress the lowering of light utilization efficiency due to manufacturing errors. As a result, the light utilization efficiency can be enhanced. Here, the shadow effect is a phenomenon that the stepped portions in the optical path difference providing structure become shadows and the light utilization efficiency lowers corresponding to the shadows. As the depth of the stepped portions becomes deeper, the shadow effect becomes larger, and then the loss of the light utilization efficiency becomes larger, regardless of the manufacturing errors. Further, with this, in the intermediate region, the temperature characteristic correction effect at the time of use of the BD becomes smaller. However, in both the first basic structure and the second basic structure on the central region, when the wavelength changes to become longer, the correction becomes deficient. Accordingly, it becomes possible to prevent the temperature characteristic from becoming too bad, and it becomes possible to increase the wavelength characteristic correction effect at the time of use of the BD. In addition, at the time of use of the DVD, both the temperature characteristic and the wavelength characteristic of the DVD can be made good. Accordingly, in the optical pickup apparatus, even when temperature or wavelength changes at the time of use of the DVD, it becomes possible to eliminate a need to move a coupling lens, such as a collimator, toward the optical axis direction. Therefore, it becomes possible to prevent the possibility that flare light adversely influences a spot performance by moving a coupling lens at the time of use of the DVD. Further, since firmware and programs used to move a coupling lens become unnecessary, development cost can be also reduced.

The objective lens described in claim 8 is configured in the invention described in claim 7 such that at the time of converging the first light flux onto the information recording surface of the BD, when the wavelength of the first light flux changes by +5 nm, an amount of change of the third order spherical aberration is −30 mλ rms or more and +50 mλ rms or less.

With this, the wavelength characteristic correction effect can be enlarged more at the time of use of the BD, and both the temperature characteristic and the wavelength characteristic of the DVD can be made good at the time of use of the DVD.

The objective lens described in claim 9 is configured in the invention described in any one of claims 1 to 8 such that the following expression is satisfied, $0.8 \leq d/f1 \leq 1.5$ where d represents a thickness (mm) of the objective lens on the optical axis, and f1 represents a focal length (mm) of the objective lens for the first light flux.

In the case of adaptation to optical discs designed for use with a high NA and a short wavelength such as BDs, there are problems that, in an objective lens, astigmatism tends to occur, and also an eccentric comatic aberration also tends to occur. However, the satisfaction of the above conditional expression enables to suppress the occurrence of the astigmatism and the eccentric comatic aberration.

Further, with the satisfaction of the above conditional expression, the objective lens becomes a thick objective lens with a thick axial thickness, which results in that a working distance at the time of performing recording/reproducing for the CD tends to become short. However, the arrangement of the first optical path difference providing structure of the present invention on the objective lens enables to ensure a sufficient working distance at the time of performing recording/reproducing for the CD, thereby making the effect of the present invention become more remarkable.

The objective lens described in claim 10 is configured in the invention described in any one of claims 1 to 9 such that the central region includes only the first optical path difference providing structure in which only the first basic structure and the second basic structure are superimposed on each other, and the intermediate region includes only the second optical path difference providing structure in which only the third basic structure and the fourth basic structure are superimposed on each other.

With this, it becomes possible to provide an objective lens with an optical path difference providing structure which has a simple configuration and a comparatively small level difference and is enhanced in terms of manufacture easiness. Accordingly, it becomes possible to suppress the fluctuation of diffraction efficiency so as to become small even when wavelength changes or when temperature changes, further, it becomes possible to suppress the lowering of light utilization efficiency due to manufacturing errors or shadow effects.

An optical pickup apparatus described in claim 11 is configured to include the objective lens described in any one of claims 1 to 10.

The optical pickup apparatus described in claim 12 is configured in the invention described in claim 11 such that the second optical path difference providing structure has a structure in which at least a third basic structure and a fourth basic structure are superimposed on each other, wherein in one of the third basic structure and the fourth basic structure, when the wavelength of an entering light flux changes to become longer, a spherical aberration changes in a deficient correction direction, and in the other one, when the wavelength of an entering light flux changes to become longer, a spherical aberration changes in an excessive correction direction. Further, the optical pickup apparatus includes a coupling lens through which at least the first light flux and the second light flux are configured to pass and an actuator to move the coupling lens in the optical axis direction, wherein when the first light flux passes through, the coupling lens is configured to be movable in the optical axis direction by the actuator, and when the second light flux passes through, the position of the coupling lens in the optical axis direction is fixed.

For example, in order to adapt to a BD which includes a plurality of information recording layers, it may be considered to adapt to perform recording/reproducing for each of the plurality of information recording layers by moving a coupling lens in an optical axis direction at the time of use of the BD. In such a case, although the function to move the coupling lens in the optical axis direction is already essential, there may be a case to desire to fix the coupling lens without moving it in the optical axis direction at the time of use of a DVD. The reasons why are as follows. According to one reason, although flare does not occur at the time of use of a BD, flare occurs at the time of use of a DVD. Accordingly, the movement of the coupling lens changes the aberration of the flare, which results in that the flare may influence adversely recording and/or reproducing. According to another reason, there is a desire to place always the initial position of the coupling lens at a constant position in order to discriminate the type of DVD. According to still another reason, there is a desire to simply reduce the cost, as much as possible, for firmware to move the coupling lens in a drive mechanism. For the above problems, with the configuration that in one of the third basic structure and the fourth basic structure which constitute the second optical path difference providing structure of the objective lens, when the wavelength of an entering light flux changes to become longer, a spherical aberration changes in a deficient correction direction, and in the other one, when the wavelength of an entering light flux changes to become longer, a spherical aberration changes in an excessive correction direction; both the temperature characteristic and the wavelength characteristic at the time of use of a DVD can be made good. As a result, at the time of use of a DVD, even on the condition that the position of the coupling lens in the optical axis direction is fixed when the second light flux passes through, it becomes possible to perform recording and/or reproducing information for the information recording surface of the DVD, thereby solving the above problems.

An optical information recording reproducing apparatus described in claim 13 is configured to include the optical pickup apparatus described in claim 11 or 12.

The optical pickup apparatus according to the present invention includes at least three light sources of the first light source, the second light source, and the third light source. Further, the optical pickup apparatus of the present invention includes a light converging optical system to converge the first light flux onto the information recording surface of a BD, to converge the second light flux onto the information recording surface of a DVD, and to converge the third light flux onto the information recording surface of a CD. Furthermore, the optical pickup apparatus of the present invention includes a light receiving element configured to receive a reflected light flux from the information recording surface of each of BDs, DVDs, or CDs.

The BD includes a protective substrate with a thickness t1 and an information recording surface. The DVD includes a protective substrate with a thickness t2 (t1<t2) and an information recording surface. The CD includes a protective substrate with a thickness t3 (t2<t3) and an information recording surface. In this regard, each of the BD, the DVD, and the CD may be a optical disc with multi layers including a plurality of information recording surfaces.

In the present specification, the BD represents a generic name of BD-series optical discs which are designed to perform recording and/or reproducing information via an objective lens having an NA of about 0.8 to 0.9 with a light flux having a wavelength of about 390 to 415 nm and to have a protective substrate with a thickness of about 0.05 to 0.125 mm. The BD includes a BD including only a single information recording layer and a BD including two or more information recording layers. Further, in the present specification, the DVD represents a generic name of DVD-series optical discs which are designed to perform recording and/or reproducing information via an objective lens having an NA of about 0.60 to 0.67 and to have a protective substrate with a thickness of about 0.6 mm. The DVD includes a DVD-ROM, DVD-Video, DVD-Audio, DVD-RAM, DVD-R, DVD-RW, DVD+R and DVD+RW. Furthermore, in the present specification, the CD represents a generic name of CD-series optical discs which are designed to perform recording and/or reproducing information via an objective lens having an NA of about 0.45 to 0.51 and to have a protective substrate with a thickness of about 1.2 mm. The CD includes a CD-ROM, CD-Audio, CD-Video, CD-R and CD-RW. With regard to recording density, the BD has the highest recording density, and the recording density becomes low in the order of DVD and CD.

The respective thicknesses t1, t2, and t3 of the protective substrates preferably satisfy the following conditional expressions (1), (2), and (3), but the thicknesses are not limited to those. Herein, the thickness of a protective substrate means the thickness of a protective substrate disposed on the top surface of an optical disc. Namely, it means the thickness of a protective substrate located from the top surface of an optical disc to an information recording surface positioned closest to the top surface.

$$0.050 \text{ mm} \leq t1 \leq 0.125 \text{ mm} \tag{1}$$

$$0.5 \text{ mm} \leq t2 \leq 0.7 \text{ mm} \tag{2}$$

$$1.0 \text{ mm} \leq t3 \leq 1.3 \text{ mm} \tag{3}$$

In the present specification, each of the first light source, the second light source, and the third light source is preferably a laser light source. As the laser light source, a semiconductor laser or a silicon laser can be preferably used. It is preferable that the first wavelength λ1 of a first light flux emitted from the first light source, the second wavelength λ2 (λ2>λ1) of a second light flux emitted from the second light source, and the third wavelength λ3 (λ3>λ2) of a third light flux emitted from the third light source are made to satisfy the following expressions (4) and (5).

$$1.5 \cdot \lambda 1 < \lambda 2 < 1.7 \cdot \lambda 1 \tag{4}$$

$$1.8 \cdot 8\lambda 1 < \lambda 3 < 2.0 \cdot \lambda 1 \tag{5}$$

The wavelength λ1 of the first light source is preferably 350 nm or more and 440 nm or less, and more preferably 390 nm or more and 415 nm or less. The second wavelength λ2 of the second light source is preferably 570 nm or more and 680 nm or less, and is more preferably 630 nm or more, and 670 nm or less. The third wavelength λ3 of the third light source is preferably 750 nm or more and 880 nm or less, and is more preferably 760 nm or more and 820 nm or less.

Further, at least two light sources among the first light source, the second light source, and the third light source may be unitized. The unitization means the state that, for example, the first light source and the second light source are fixed and housed in one package. In addition to the light sources, a light receiving element described below may be unitized.

As a light receiving element, a photodetector such as a photodiode is preferably used. A light flux reflected on the information recording surface of an optical disc is introduced to enter the light receiving element, and signals output from the light receiving element are used for obtaining the read-out signal of the information recorded in each optical disc. Further, a change in a light quantity due to a change in the shape of a spot and a change in the position of the spot on the light receiving element is detected, thereby performing focus detection and track detection. Based on these detection results, the objective lens can be made to move for focusing and tracking. The light receiving element may be composed of a plurality of photodetectors. The light receiving element may also include a main photodetector and a sub-photodetector. For example, the light receiving element may be constituted such that two sub-photodetectors are arranged separately on both sides of a main photodetector to receive main light fluxes used for recording and reproducing information and the two sub-photodetectors are configured to receive sub-light fluxes used for tracking adjustment. Further, the light receiving element may include a plurality of light receiving elements corresponding to respective light sources.

The light converging optical system includes an objective lens. The light converging optical system preferably includes a coupling lens such as a collimator lens other than the objective lens. The coupling lens is a single lens or a group of lenses which is arranged between the objective lens and a light source and used to change a divergent angle of a light flux. The collimator lens is one type of coupling lenses, and is a lens which converts an incident light flux into a parallel light flux and emits the parallel light flux. In the present specification, the objective lens is an optical system which is arranged at a position to face an optical disc in the optical pickup apparatus and has a function to converge a light flux emitted from the light source onto the information recording surface of the optical disc. The objective lens of the present invention is a single plastic lens. Preferably, the objective lens is a convex lens. Further, the objective lens preferably has a refractive surface being an aspheric surface. Furthermore, the objective lens preferably has a base surface on which an optical path difference providing structure is disposed and which is an aspheric surface.

Incidentally, as a plastic material which constitutes the objective lens, it is preferable to employ alicyclic hydrocarbon polymer materials such as cyclic olefin resin materials. Among the above materials, it is more preferable to employ resin materials with a refractive index within a range of 1.54 to 1.60 at a temperature of 25° C. for a wavelength of 405 nm and a rate of change of refractive index dN/dT (° C.$^{-1}$) of $-20\times10^{-5}$ to $-5\times10^{-5}$ (more preferably, $-10\times10^{-5}$ to $-8\times10^{-5}$), where the rate of change of refractive index is a rate of change of refractive index for a wavelength of 405 nm when temperature changes in a temperature range of $-5°$ C. to 70° C. Further, in the case where the objective lens is a plastic lens, it is preferable that the coupling lens is also made to a plastic lens.

Preferable examples of the alicyclic hydrocarbon polymer will be described below.

A first preferable example is a resin composition composed of a block copolymer which includes a polymer block [A] containing a repeating unit [1] represented by the following formula (I), and a polymer block [B] containing the repeating unit [1] represented by the Formula (I) and a repeating unit [2] represented by the following formula (II) and/or a repeating unit [3] represented by the formula (III), wherein the mol fraction "a" (mol %) of the repeating unit [1] in the polymer block [A] and the mol fraction "b" (mol %) of the repeating unit [1] in the polymer block [B] are made to satisfy a relationship of a>b.

[Chemical Formula 1]

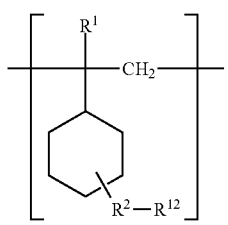

(I)

In Formula (I), $R^1$ represents a hydrogen atom or an alkyl group with 1 to 20 carbon atoms, $R^2$ to $R^{12}$ each independently represents a hydrogen atom, an alkyl group with 1 to 20 carbon atoms, a hydroxyl group, an alkoxy group with 1 to 20 carbon atoms or a halogen group.

[Chemical Formula 2]

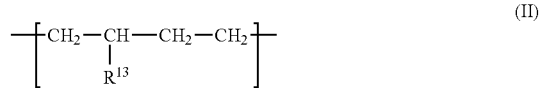

(II)

In Formula 2, $R^{13}$ represents a hydrogen atom or an alkyl group with 1 to 20 carbon atoms.

[Chemical Formula 3]

(III)

In Formula 3, $R^{14}$ and $R^{15}$ each independently represents a hydrogen atom or an alkyl group with 1 to 20 carbon atoms.

Next, a second preferable example is a resin composition which contains a polymer (A) obtained through addition polymerization of a monomer composition composed of at least α-olefin with 2 to 20 carbon atoms and cyclic olefin represented by the following general formula (IV) and a polymer (B) obtained through addition polymerization of a monomer composition composed of α-olefin with 2 to 20 carbon atoms and cyclic olefin represented by the following general formula (V).

[Chemical Formula 4]

General Formula (IV)

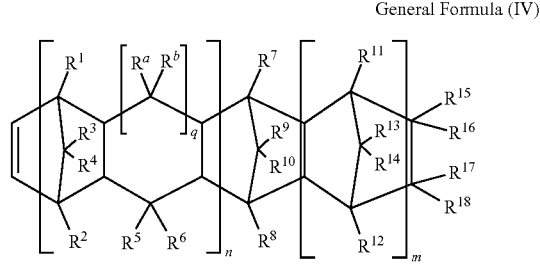

In the general formula IV, n is 0 or 1, m is 0 or an integer of 1 or more, and q is 0 or 1. $R^1$ to $R^{18}$ and $R^a$ and $R^b$ each independently represents a hydrogen atom, a halogen atom or a hydrocarbon group. $R^{15}$ to $R^{18}$ may be bonded to each other so as to form a monocyclic or polycyclic framework, and the monocyclic or polycyclic group formed in a parenthesis may have a double bond. Further, $R^{15}$ and $R^{16}$ or $R^{17}$ and $R^{18}$ may form an alkylidene group.

[Chemical Formula 5]

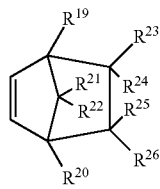

General Formula (V)

In the general formula V, $R^{19}$ to $R^{26}$ each independently represents a hydrogen atom, a halogen atom or a hydrocarbon group.

The following additives may be added to the resin materials in order to add an extra property.

(Stabilizer)

It is preferable that at least one type of Stabilizer selected from a group of phenol type stabilizer, hindered amine type stabilizer, phosphor type stabilizer, and sulfur type stabilizer. By properly selecting and adding these stabilizers, it becomes possible to suppress greatly white turbidity and fluctuation of optical properties such as fluctuation of refractive index due to continuous irradiation of a light flux with a short wavelength such as 405 nm.

As preferable phenol type stabilizers, conventionally-known ones may be employed. Examples of the phenol type stabilizers include: acrylate compounds described in JP-A Nos. S63-179953 and H1-168643, such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl) ethyl)phenyl acrylate; alkyl-substituted phenol compounds, such as octadecyl-3-(3,5-di-t-butyl-4-hydroxyphenyl) propionate, 2,2'-methylene-bis(4-methyl-6-t-butylphenol), 1,1,3-tris(2-methyl-4-hydroxy-5-t-butylphenyl)butane, 1,3,5-trimethyl-2,4,6-tris (3,5-di-t-butyl-4-hydroxybenzyl)benzene, tetrakis(methylene-3-(3',5'-di-t-butyl-4'-hydroxyphenylpropionate)methane [namely, pentaerythrimethyl-tetrakis(3-(3, 5-di-t-butyl-4-hydroxyphenylpropionate))], and triethylene glycol bis-(3-(3-t-butyl-4-hydroxy-5-methylphenyl)-propionate); and triazine group-containing phenol compounds, such as 6-(4-hydroxy-3,5-di-t-butylanilino)-2,4-bisoctyl-1,3, 5-triazine, 4-bisoctylthio-1,3,5-triazine, and 2-octylthio-4,6-bis-(3,5-di-t-butyl-4-oxyanilino)-1,3,5-triazine.

Preferable examples of hindered amine type stabilizers include: bis(2,2,6,6-tetramethyl-4-piperidyl)sebacate, bis(2, 2,6,6-tetramethyl-4-piperidyl)succinate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2, 6,6-tetramethyl-4-piperidyl)sebacate, bis(1,2,2,6,6-pentamethyl-4-piperidyl)-2-(3,5-di-t-butyl-4-hydroxybenzyl)-2-butylmalonate, bis(1-acroyl-2,2,6,6-tetramethyl-4-piperidyl)2,2-bis(3,5-di-t-butyl-4-hydroxybenzyl)-2-butylmalonate, bis(1,2,2,6,6-pentamethyl-4-piperidyl decanedioate, 2,2,6,6-tetramethyl-4-piperidyl methacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethyl piperidine, 2-methyl-2-(2,2,6,6-tetramethyl-4-piperidyl) amino-N-(2,2,6,6-tetramethyl-4-piperidyl)propionamide, tetrakis(2,2,6,6-tetramethyl-4-piperidyl)1,2,3,4-butanetetracarboxylate, and tetrakis(1,2,2,6,6-pentamethyl-4-piperidyl) 1,2,3,4-butanetetracarboxylate.

As preferable phosphor type stabilizers, ones usually employed in the field of general resin industry may be employed without specific limitations. Examples of the phosphor type stabilizers include: monophosphite compounds such as triphenyl phosphate, diphenylisodecyl phosphate, phenylisodecyl phosphate, tris(nonylphenyl) phosphate, tris (dinonylphenyl) phosphate, tris(dinonylphenyl) phosphate, tris(2,4-di-t-butylphenyl) phosphate, and 10-(3,5-di-t-butyl-4-hydroxybenzyl)-9,10-dihydro-9-oxa-10-Phosphaphenanthrene-10-oxide; and diphosphite compounds, such as 4,4'-butylidene-bis(3-methyl-6-t-butylphenyl-di-tridecyl phosphate, and 4,4'-isopropyridene-bis(phenyl-di-alkyl($C_{12}$ to $C_{15}$) phosphate). Of these, the monophosphite compounds are preferable and tris(nonylphenyl) phosphate, tris(dinonylphenyl) phosphate and tris(2,4,-di-t-butylphenyl) phosphate are particularly preferable.

Examples of preferable sulfur type stabilizer include: dilauryl 3,3-thiodipropionate, dimyrystyl 3,3'-thiodipropionate, distearyl 3,3-thiodipropionate, laurystearyl 3,3-dithiopropionate, pentaerythrytol-tetrakis-(□-laurylstearyl-thiopropionate and 3,9-bis-(2-dodecylthioethyl)-2,4,8,10-tetrakispiro[5,5]undecane.

The blending amount of each stabilizer may be properly decided within a range in which the object of the invention is not failed. However, it is usually from 0.01 to 2 parts by weight, and preferably from 0.01 to 1 part by weight to 100 parts by weight of the alicyclic hydrocarbon polymer.

(Surfactant)

Surfactant is a compound having a hydrophilic group and a hydrophobic group in the same molecule. The surfactant can prevent cloudiness of resin composition by adjusting adhesion of moisture to the surface of the resin composition the evaporation rate of the moisture from the above surface.

Specific examples of the hydrophilic group in the surfactant include: a hydroxy group, a hydroxyalkyl group having at least one carbon atom, a hydroxyl group, a carbonyl group, an ester group, an amino group, an amide group, an ammonium salt, thiol, sulfate, phosphate, and a polyalkyleneglycol group. Herein, the amino group may be any one of a primary amino group, a secondary amino group and a tertiary amino group. Specific examples of the hydrophobic group in the surfactant include: an alkyl group having six or more carbon atoms, a silyl group including an alkyl group having six or more carbon atoms, and a fluoroalkyl group having six or more carbon atoms. Herein, the alkyl group having six or more carbon atoms may include an aromatic ring as a substituent. Specific examples of the alkyl group include: hexyl, heptyl, octyl, nonyl, decyl, undecenyl, dodecyl, tridecyl, tetradecyl, myristyl, stearyl, lauryl, palmityl, and cyclohexyl. Examples of the aromatic ring include: a phenyl group. This surfactant may include at least one hydrophilic group and one hydrophobic group in the same molecule, or may include two or more hydrophilic groups and two or more hydrophobic groups.

Further, more specific examples of such the surfactant include: myristyl diethanolamine, 2-hydroxyethyl-2-hydroxyldodexylamine, 2-hydroxyethyl-2-hydroxytridecylamine, 2-hydroxyethyl-2-hydroxytetradecylamine, pentaerythritolmonostearate, pentaerythritoldistearate, pentaerythritoltristearate, di-2-hydroxyethyl-2-hydroxydodecylamine, alkyl (8 to 18 carbon atoms) benzyldimethylammonium chloride, ethylene bis alkyl (8 to 18 carbon atoms) amide, stearyl diethanolamide, lauryl diethanolamide, myristyl diethanolamide, and palmityl diethanolamide. Of these, amine compounds and amide compounds each including a hydroxyalkyl group are preferably used. In the present invention, these compounds may be used in combination of two or more kinds.

The adding amount of the surfactant is preferably from 0.01 to 10 parts by weight to 100 parts by weight of the alicyclic hydrocarbon polymer from the viewpoints of efficient suppression of cloudiness of a molding product due to fluctuation of temperature and humidity and retention of the high light transmittance of the molding product. The addition amount of the surfactant is more preferably 0.05 to 5 parts by weight to 100 parts by weight of the alicyclic hydrocarbon polymer, and still more preferably 0.3-3 parts by weight.
(Plasticizer)

The plasticizer may be added in order to adjust the melt index of the copolymer in response to a need.

As the plasticizer, generally-known ones may be employed. Examples of the plasticizer include: bis(2-ethylhexyl)adipate, bis(2-budoxyethyl)adipate, bis(2-ethylhexyl)azelate, dipropyleneglycol dibenzoate, tri-n-butyl citrate, tri-n-butylacetyl citrate, epoxidized soybean oil, 2-ethylhexyl epoxidized tall oil, chlorinated paraffin, tri-2-ethylhexyl phosphate, tricresyl phosphate, t-butylphenyl phosphate, tri-2-ethylhexyldiphenyl phosphate, dibutyl phtalate, diisohexyl phthalate, diheptyl phthalate, dinonyl phthalate, diundecyl phthalate, di-2-ethylhexyl phthalate, diisononyl phthalate, diisodecyl phthalate, ditridecyl phthalate, butylbenzyl phthalate, disyclohexyl phthalate, bis(2-ethylhexyl)sebacate, (tri-2-ethylhexyl)trimellitic acid, Santicizer 278, Paraplex G40, Drapex 334F, Plastolein 9720, Mesamoll, DNODP-610, and HB-40. Selection of placticizer and determination of an addition amount of the selected placticizer can be made appropriately on the conditions that the transmittance and durability against environmental change of the copolymer are not spoiled.

As these resins, cycloolefin resins are preferably employed. Specifically, preferable examples include ZEONEX manufactured by Zeon Corporation, APEL manufactured by Mitsui Chemicals Inc., Inc., TOPAS manufactured by TOPAS Advanced Polymers Corporation, ARTON manufactured by JSR Corporation, are cited.

Moreover, it is preferable that a material constituting the objective lens has an Abbe number of 50 or more.

Hereinafter, description will be given to the objective lens. The objective lens has at least one optical surface which includes at least a central region, an intermediate region surrounding the central region, and a peripheral region surrounding the intermediate region. It is preferable that the central region is a region including the optical axis of the objective lens. However, a minute region including the optical axis may be assigned to serve as an unused region or a region for a special purpose, and a region surrounding the minute region may be assigned to serve as a center region (also referred to as "central region"). The central region, intermediate region, and peripheral region are preferably disposed on the same optical surface. As shown in FIG. 1, it is preferable that a central region CN, an intermediate region MD, and a peripheral region OT are disposed concentrically around a center formed by an optical axis on the same optical surface. Further, a first optical path difference providing structure is disposed on the central region of the objective lens, and a second optical path difference providing structure is disposed on the intermediate region. The peripheral region may be a refractive surface, or a third optical path difference providing structure may be disposed on the peripheral region. It is preferable that the central region adjoins the intermediate region, and the intermediate region adjoins the peripheral region. However, there may be a slight gap between the central region and the intermediate region and between the intermediate region and the peripheral region.

The central region of the objective lens may be deemed as a BD/DVD/CD common region configured to be used for recording and/or reproducing information for a BD, a DVD, and a CD. Namely, the objective lens is configured to converge a first light flux passing through the central region onto the information recording surface of the BD so as to enable to record and/or reproduce information, to converge a second light flux passing through the central region onto the information recording surface of the DVD so as to enable to record and/or reproduce information, and to converge a third light flux passing through the central region onto the information recording surface of the CD so as to enable to record and/or reproduce information. Further, it is preferable that the first optical path difference providing structure disposed on the central region is configured to correct a spherical aberration caused by a difference between the thickness t1 of the protective substrate of the BD and the thickness t2 of the protective substrate of the DVD and/or a spherical aberration caused by a difference in wavelength between the first light flux and the second light flux for the first light flux and the second light flux when passing through the first optical path difference providing structure. Furthermore, it is preferable that the first optical path difference providing structure is configured to correct a spherical aberration caused by a difference between the thickness t1 of the protective substrate of the BD and the thickness t3 of the protective substrate of the CD and/or a spherical aberration caused by a difference in wavelength between the first light flux and the third light flux, for the first light flux and the third light flux when passing through the first optical path difference providing structure.

The intermediate region of the objective lens may be deemed as a BD/DVD common region configured to be used for recording and/or reproducing for the BD and the DVD, but not to be used for recording and/or reproducing for the CD. Namely, the objective lens is configured to converge the first light flux passing through the intermediate region onto the information recording surface of the BD so as to enable to record and/or reproduce information, and to converge the second light flux passing through the intermediate region onto the information recording surface of the DVD so as to enable to record and/or reproduce information. On the other hand, the objective lens is configured not to converge the third light flux passing through the intermediate region onto the information recording surface of the CD so as to enable to record and/or reproduce information. It is preferable that the third light flux having passed through the intermediate region of the objective lens forms flare on the information recording surface of the CD. As shown in FIG. 2, when the third light flux having passed through the objective lens forms a spot on the information recording surface of the CD, it is preferable that the spot includes a central spot portion SCN having high light density, an intermediate spot portion SMD having light density lower than that of the central spot portion, and a peripheral spot portion SOT having light density higher than that of the intermediate spot portion and lower than that of the central spot portion in the order from the optical axis side (or the central spot portion) to the outside. The central spot portion is used for recording and/or reproducing information for an optical disc, while, the intermediate spot portion and the peripheral spot portion are not used for recording and/or reproducing information for the optical disc. In the foregoing, the peripheral spot portion is called flare. However, also in the case where an intermediate spot portion does not exist around a central spot portion and a peripheral spot portion exists, namely, in the case where weak light forms a large spot around a converged light spot, the peripheral spot portion may be called flare. In other words, it may be said that it is preferable that the third light flux having passed through the intermediate region of the objective lens forms a peripheral spot portion on the information recording surface of the CD.

The peripheral region of the objective lens may be deemed as the BD exclusive region configured to be used for recording and/or reproducing for the BD, but not to be used for recording and/or reproducing for the DVD and the CD. Namely, the objective lens is configured to converge the first light flux passing through the peripheral region onto the information recording surface of the BD so as to enable to record and/or reproduce information. On the other hand, the objective lens is configured not to converge the second light flux passing through the peripheral region onto the information recording surface of the DVD so as to enable to record and/or reproduce information, and not to converge the third light flux passing through the peripheral region onto the information recording surface of the CD so as to enable to record and/or reproduce information. It is preferable that the second light flux and the third light flux each of which passes separately through the peripheral region of the objective lens form flare on the respective information recording surfaces of the DVD and the CD respectively. In other words, it is preferable that the second light flux and the third light flux each of which has passed separately through the peripheral region of the objective lens form the peripheral spot portion on the respective information recording surfaces of the DVD and the CD respectively.

It is preferable that the first optical path difference providing structure is disposed on a region which occupies 70% or more of the area of the central region of the objective lens, and it is more preferable that the region occupies 90% or more of the area. Still more preferably, the first optical path difference providing structure is disposed on the whole surface of the central region. It is preferable that the second optical path difference providing structure is disposed on a region which occupies 70% or more of the area of the intermediate region of the objective lens, and it is more preferable that the region occupies 90% or more of the area. Still more preferably, the second optical path difference providing structure is disposed on the whole surface of the intermediate region. In the case where the peripheral region has the third optical path difference providing structure thereon, it is preferable that the third optical path difference providing structure is disposed on a region which occupies 70% or more of the area of the peripheral region of the objective lens, and it is more preferable that the region occupies 90% or more of the area. Still more preferably, the third optical path difference providing structure is disposed on the whole surface of the peripheral region.

Incidentally, the optical path difference providing structure mentioned in the present specification is a general term for the structure that provides an optical path difference to an incident light flux (an entering light flux). The optical path difference providing structure also includes a phase difference providing structure that provides a phase difference. Further, the phase difference providing structure includes a diffractive structure. It is preferable that the optical path difference providing structure of the present embodiment is a diffractive structure. The optical path difference providing structure includes a stepped portion, and preferably includes a plurality of stepped portions. With the stepped portion or stepped portions, an optical path difference and/or a phase difference is provided to an incident light flux. An optical path difference provided by the optical path difference providing structure may either be an integral multiple of the wavelength of an incident light flux or be a non-integral multiple of the wavelength of an incident light flux. The stepped portions may either be arranged with periodical intervals in the direction perpendicular to the optical axis, or be arranged with non-periodical intervals in the direction perpendicular to the optical axis. In the case where the objective lens equipped with an optical path difference providing structure is an aspheric single lens, an incident angle of a light flux to the objective lens becomes different from other light fluxes depending on a height from the optical axis. Accordingly, an amount of a level difference of a stepped portion on the optical path difference providing structure becomes slightly different from other stepped portions for each ring-shaped zone. For example, in the case where the objective lens is a convex single lens with an aspheric surface, even in the optical path difference providing structure that provides the same optical path difference, as a stepped portion becomes more distant from the optical axis, an amount of a level difference in the stepped portion tends to become larger.

Further, a diffractive structure mentioned in the present specification is a general term for a structure that includes a stepped portion or stepped portions and has a function to converge a light flux or to diverge a light flux by a diffracting action. For example, the diffractive structure includes a structure configured such that a plurality of unit shapes are arranged around the optical axis, a light flux enters for each of the plurality of unit shapes, and then the respective wave surfaces of light fluxes having passed through the respective unit shapes cause a shift for each pair of adjoining ring-shaped zones. As a result, the light fluxes form new respective wave surfaces, whereby the light fluxes are converged or diverged. The diffractive structure preferably includes a plurality of stepped portions, and the stepped portions may either be arranged with periodic intervals in the direction perpendicular to the optical axis, or be arranged with non-periodic intervals in the direction perpendicular to the optical axis. In the case where the objective lens equipped with a diffractive structure is an aspheric single lens, an incident angle of a light flux to the objective lens becomes different from other light fluxes depending on a height of it from the optical axis. Accordingly, an amount of a level difference in a stepped portion of the diffractive structure becomes slightly different from other stepped portions for each ring-shaped zone. For example, in the case where the objective lens is a convex single lens with an aspheric surface, even in the diffractive structure that generates diffracted light fluxes with the same diffraction order, as a stepped portion becomes more distant from the optical axis, an amount of a level difference in the stepped portion tends to become larger.

Incidentally, it is preferable that the optical path difference providing structure includes a plurality of ring-shaped zones which are formed concentrically around a center formed by the optical axis. Further, the optical path difference providing structure may take generally various sectional forms (sectional form on a plane including an optical axis), and are classified roughly into a blaze-type structure and a stairway structure in terms of a sectional form including the optical axis.

As shown in FIGS. 3a and 3b, the blaze-type structure is configured such that the sectional form including the optical axis of an optical element having an optical path difference providing structure is shaped in a serrated shape. In the example shown in FIG. 3, it is assumed that the upper portion of the sheet is the light source side, and the lower portion of the sheet is the optical disc side, and that an optical path difference providing structure is formed on a plane deemed as a base aspheric surface. In the blaze-type structure, a length of one blaze unit in the direction perpendicular to the optical axis is called a pitch P (refer to FIGS. 3a and 3b). Further, a length of a stepped portion of a blaze in the direction parallel to the optical axis is called a level difference B (refer to FIG. 3a).

Further, as shown in FIGS. 3c and 3d, the stairway structure is configured such that a sectional form including an optical axis of an optical element having an optical path difference providing structure includes a plurality of small stairways (each stairway referred to as "a stair unit"). Incidentally, the term "V-level" mentioned in the present specification means that a ring-shaped surface (hereafter, also referred to as "terrace surface") corresponding (orienting) to the direction perpendicular to the optical axis in one stair unit of the stairway structure is separated by stepped portions into the number of V of ring-shaped surfaces. Accordingly, the stairway structure of three levels or more in particular is made to have a small stepped portion (small level difference) and a large stepped portion (large level difference).

For example, an optical path difference providing structure shown in FIG. 3c is called a 5-level stairway structure, and an optical path difference providing structure shown in FIG. 3d is called a 2-level stairway structure (which is called also a binary structure). Hereafter, the 2-level stairway structure will be explained. In the case where the 2-level stairway structure includes a plurality of ring-shaped zones formed concentrically around a center formed by the optical axis, the cross sectional configuration of the plurality of ring-shaped zones at a position including the optical axis of the objective lens, is formed by multiple stepped surfaces Pa and Pb each extending in parallel to the optical axis, light-source-side terrace surfaces Pc each connecting the respective light-source-side ends of a pair of neighboring stepped surfaces Pa and Pb, and optical-disc-side terrace surfaces Pd each connecting the respective optical-disc-side ends of a pair of neighboring stepped surfaces Pa and Pb. The light-source-side terrace surfaces Pc and the optical-disc-side terrace surfaces Pd are arranged alternately along a direction crossing the optical axis.

Further, in the stairway structure, a length of one stair unit in the direction perpendicular to the optical axis is called pitch P (see FIGS. 3c and 3d). Further, a length of a stepped portion in the direction parallel to the optical axis is called a level difference B1 or B2. In the case of the stairway structure of 3 levels or more, a large level difference B1 and a small level difference B2 are arranged (refer to FIG. 3c).

Incidentally, it is preferable that an optical path difference providing structure is configured such that a certain unit shape is repeated periodically. Herein, the expression "a unit shape is repeated periodically" naturally includes a structure where the same structure is repeated with the same period (pitch). Further, the expression "a unit shape is repeated periodically" also includes a structure where the period (pitch) of a unit shape serving as a unit of a period becomes gradually longer or becomes gradually shorter with regularity.

In the case where the optical path difference providing structure has a blaze-type structure, it is configured such that a serrated shape representing a unit shape is repeated. As shown in FIG. 3a, the same serrated shape is repeated, or as shown in FIG. 3b, as the serrated shape advances in a direction separating from the optical axis, the pitch of the serrated shape becomes gradually longer or shorter. In addition, the optical path difference providing structure may be configured such that, in a certain region, the stepped portion of the blaze-type structure faces in the direction reverse to the direction going to the optical axis (center), in the other region, the stepped portion of the blaze-type structure faces in the direction going to the optical axis (center), and between them, a transition region necessary for switching over the orientation of the stepped portion of the blaze-type structure is arranged.

Incidentally, as stated above, in the case where the orientation of the stepped portion of the blaze-type structure is switched over on the way, it becomes possible to enlarge the pitch of the ring-shaped zones. Accordingly, it becomes possible to suppress the lowering of transmittance due to the manufacturing errors of the optical path difference providing structure.

In the case where the optical path difference providing structure includes the stairway structure, it may be configured such that a 5-level stair unit as shown in FIG. 3c is repeated. Further, it may be configured such that as the stair unit advances in the direction separating from the optical axis, the pitch of the stair unit becomes gradually longer or shorter.

Further, the first optical path difference providing structure and the second optical path difference providing structure may be disposed separately on the respective different optical surfaces of the objective lens. However, it is preferable that the first optical path difference providing structure and the second optical path difference providing structure are disposed on the same optical surface. Furthermore, in the case where the third optical path difference providing structure is disposed, it is preferable that the third optical path difference providing structure is disposed on the same optical surface on which the first optical path difference providing structure and the second optical path difference providing structure are disposed. By disposing them on the same optical surface, it becomes possible to lessen decentering errors in the manufacturing process, which is preferable. Further, it is preferable that the first optical path difference providing structure, the second optical path difference providing structure, and the third optical path difference providing structure are disposed on the light-source side surface of the objective lens, rather than the optical-disc side surface of the objective lens. In another expression, it is preferable that the first optical path difference providing structure, the second optical path difference providing structure, and the third optical path difference providing structure are disposed on the optical surface of the objective lens which has a smaller absolute value of a radius of curvature.

Next, the first optical path difference providing structure disposed on the central region will be explained. The first optical path difference providing structure is configured such that at least a first basic structure and a second basic structure are superimposed on each other. It is preferable that the first optical path difference providing structure is configured such that only a first basic structure and a second basic structure are superimposed on each other.

The first basic structure is of a blaze-type structure. Further, the first basic structure is configured to make a light quantity of the first order diffracted light flux of the first light flux having passed through the first basic structure larger than a light quantity of any other order diffracted light flux, to make a light quantity of the first order diffracted light flux of the second light flux having passed through the first basic structure larger than a light quantity of any other order diffracted light flux, and to make a light quantity of the first order diffracted light flux of the third light flux having passed through the first basic structure larger than a light quantity of any other order diffracted light flux. This configuration is called a (1/1/1) structure. In particular, with the structure configured to generate a first order diffracted light flux being a lower diffraction order, an amount of a level difference in the first basic structure does not become too large, which facilitates manufacture. Accordingly, it becomes possible to suppress a loss of light quantity caused by manufacturing errors, and to reduce the fluctuation of diffraction efficiency when wavelength fluctuates, which is preferable.

Further, in at least a part of the first basic structure arranged in the vicinity of the optical axis on the central region, it is preferable that the stepped portion faces in the direction reverse to the direction going to the optical axis. The expression "a stepped portion faces in the direction reverse to the direction going to the optical axis" means the state shown in FIG. 4b. Further, the expression "at least a part of the first basic structure arranged in the vicinity of the optical axis in the central region" means at least a stepped portion positioned closest to the optical axis among the stepped portions with the (1/1/1) structure. It is preferable that on a region disposed between the optical axis and a middle point (1/2) in the direction perpendicular to the optical axis between the optical axis and a boundary between the central region and the intermediate region, at least stepped portions existing on this region with the (1/1/1) structure face in the direction reverse to the direction going to the optical axis.

For example, in a part of the first basic structure arranged in the vicinity of the intermediate region on the central region, the stepped portions may face in the direction going to the optical axis. Namely, as shown in FIG. 5b, in the first basic structure in the vicinity of the optical axis, stepped portions face in the direction reverse to the direction going to the optical axis. However, the orientation of the stepped portion is switched over on the way, and in the vicinity of the intermediate region, the stepped portions of the first basic structure may be configured to face in the direction going to the optical axis. However, it is preferable that all the stepped portions of the first basic structure disposed on the central region face in the direction reverse to the direction going to the optical axis.

Thus, with the configuration that the stepped portions of the first basic structure, in which a diffraction order of the first light flux becomes a first order, are configured to face in the direction reverse to the direction going to the optical axis, even in a thick objective lens which is used for the compatibility of three types of optical discs of BDs, DVDs and CDs and has a thick axial thickness, it becomes possible to enable to ensure a sufficient working distance at the time of us of a CD.

Even in a thick objective lens which is used for the compatibility of three types of optical disc of BDs, DVDs and CDs and has a thick axial thickness, from the viewpoint of ensuring a sufficient working distance at the time of us of a CD, it is preferable that the first basic structure has a paraxial power for the first light flux. Herein, the expression "to have a paraxial power" means that in the case where the optical path difference function of the first basic structure is represented by the numeral expression (2) described later, the term "$B_2h^2$" is not 0.

The second basic structure is also a blaze-type structure. The second basic structure is configured to make a light quantity of the second order diffracted light flux of the first light flux having passed through the second basic structure larger than a light quantity of any other order diffracted light flux, to make a light quantity of the first order diffracted light flux of the second light flux having passed through the first basic structure larger than a light quantity of any other order diffracted light flux, and to make a light quantity of the first order diffracted light flux of the third light flux having passed through the first basic structure larger than a light quantity of any other order diffracted light flux. This configuration is called a (2/1/1) structure. In particular, with the structure configured to generate a second order diffracted light flux or a first order diffracted light flux both being a lower diffraction order, an amount of a level difference in the second basic structure does not become too large, which facilitates manufacture. Accordingly, it becomes possible to suppress a loss of light quantity caused by manufacturing errors, and to reduce the fluctuation of diffraction efficiency when wavelength fluctuates, which is preferable.

Further, in at least a part of the second basic structure disposed in the vicinity of the optical axis on the central region, it is preferable that the stepped portion faces in the direction going to the optical axis. The expression "a stepped portion faces in the direction going to the optical axis" means the state shown in FIG. 4a. Further, the expression "at least a part of the second basic structure disposed in the vicinity of the optical axis on the central region" means at least a stepped portion positioned closest to the optical axis among the stepped portions with the (2/1/1) structure. It is preferable that on a region disposed between the optical axis and a middle point (1/2) in the direction perpendicular to the optical axis between the optical axis and a boundary between the central region and the intermediate region, at least stepped portions existing on this region with the (2/1/1) structure face in the direction going to the optical axis.

For example, in a part of the second basic structure disposed on the central region in the vicinity of the intermediate region, the stepped portions may face in the direction reverse to the direction going to the optical axis. Namely, as shown in FIG. 5a, in the second basic structure in the vicinity of the optical axis, stepped portions face in the direction going to the optical axis. However, the orientation of the stepped portion is switched over on the way, and in the vicinity of the intermediate region, the stepped portions of the second basic structure may be configured to face in the direction reverse to the direction going to the optical axis. However, it is preferable that all the stepped portions of the second basic structure disposed on the central region face in the direction going to the optical axis.

With the first optical path difference providing structure in which the first basic structure being the (1/1/1) structure and the second basic structure being the (2/1/1) structure are superimposed on each other, the height of the stepped portions can be made very low. Accordingly, it becomes possible to reduce manufacturing errors more, whereby it becomes possible to suppress a loss of light quantity more, and to reduce the fluctuation of diffraction efficiency when wavelength fluctuates.

With the configuration that the first basic structure, in which at least stepped portions arranged in the vicinity of the optical axis on the central region face in the direction reverse to the direction going to the optical axis, and the second basic structure, in which at least stepped portions arranged in the vicinity of the optical axis on the central region face in the direction going to the optical axis, are superimposed on each other, as compared with the case where the first basic structure and the second basic structure are superimposed on each other such that stepped portions face in the same direction, it becomes possible to suppress more the height of the stepped portions after the superimposition so as not to become high. Accordingly with this, it becomes possible to suppress a loss of light quantity caused by manufacturing errors, and to reduce the fluctuation of diffraction efficiency when wavelength fluctuates.

Further, it becomes possible only to make an objective lens compatible for three types of optical discs of BDs, DVDs, and CDs, but also to provide an objective lens with well-balanced light utilizing efficiency capable of maintaining high light utilization efficiency for each of the three types of optical discs of BDs, DVDs, and CDs. For example, it becomes possible to provide an objective lens configured to make the diffraction efficiency for wavelength $\lambda 1$ to be 80% or more, the diffraction efficiency for wavelength $\lambda 2$ to be 60% or more, and the diffraction efficiency for wavelength λ3 to be 50% or more. Further, it becomes possible to provide an objective lens configured to make the diffraction efficiency for wavelength λ1 to be 80% or more, the diffraction efficiency for wavelength λ2 to be 70% or more, and the diffraction efficiency for wavelength λ3 to be 60% or more. In addition, with the configuration that the orientation of the stepped portions of the first basic structure is directed to the direction reverse to the direction going to the optical axis, when wavelength changes to become longer, it becomes easy to make an aberration change in an under (deficient correction) direction.

From the viewpoint in terms of the configuration and a level difference in the first optical path difference providing structure in which the first basic structure with the stepped portions facing in the direction reverse to the direction going to the optical axis and the second basic structure with the stepped portions facing in the direction going to the optical axis have been superimposed on each other, the first optical path difference providing structure in which the first basic structure being the (1/1/1) structure and the second basic structure being the (2/1/1) structure are superimposed on each other may be expressed as follows. It is preferable that at least a part of the first optical path difference providing structure disposed in the vicinity of the optical axis on the central region includes both of the stepped portions facing in the direction reverse to the direction going to the optical axis and the stepped portions facing in the direction going to the optical axis, and an amount of a level difference d11 of the stepped portions facing in the direction reverse to the direction going to the optical axis and an amount of a level difference d12 of the stepped portions facing in the direction going to the optical axis satisfy the following conditional expressions (6) and (7). More preferably, on the entire region of the central region, the following conditional expressions (6) and (7) are satisfied. Here, in the case where the objective lens equipped with the optical path difference providing structure is a convex single lens with an aspheric surface, an incident angle of a light flux to the objective lens becomes different from other light fluxes depending on a height of it from the optical axis. Accordingly, even in the optical path difference providing structure that provides the same optical path difference, generally, as a stepped portion becomes more distant from the optical axis, an amount of a level difference in the stepped portion tends to become larger. The reason why the upper limit in the following expressions is multiplied by 1.5 is that the increase of an amount of a level difference is taken into account. In the expressions, n represents a refractive index of the objective lens for the first wavelength λ1.

$$0.6 \cdot (\lambda 1/(n-1)) < d11 < 1.5 \cdot (\lambda 1/(n-1)) \quad (6)$$

$$0.6 \cdot (\lambda 1/(n-1)) < d12 < 1.5 \cdot (2\lambda 1/(n-1)) \quad (7)$$

Incidentally, "at least a part of the first optical path difference providing structure disposed in the vicinity of the optical axis on the central region" means an optical path difference providing structure which includes at least both of a stepped portion located closest to the optical axis and facing in the direction reverse to the direction going to the optical axis and a stepped portion located closest to the optical axis and facing in the direction going to the optical axis. It is preferable that on a region disposed between the optical axis and a middle point (1/2) in the direction perpendicular to the optical axis between the optical axis and a boundary between the central region and the intermediate region, the optical path difference providing structure includes stepped portions existing on the region.

Further, for example, in the case where λ1 is 390 to 415 nm (0.390 to 0.415 μm) and n is 1.54 to 1.60, the above conditional expressions may be expressed as follows.

$$0.39\,\mu m < d11 < 1.15\,\mu m \quad (8)$$

$$0.39\,\mu m < d12 < 2.31\,\mu m \quad (9)$$

Furthermore, with respect to a way to superimpose the first basic structure and the second basic structure on each other, it is preferable that the pitch of the first basic structure and the pitch of the second basic structure are adjusted such that the positions of all the stepped portions of the second basic structure are matched with the positions of the stepped portions of the first basic structure, or such that the positions of all the stepped portions of the first basic structure are matched with the positions of the stepped portions of the second basic structure.

In the case where the superimposition is made such that the positions of all the stepped portions of the second basic structure are matched with the positions of the stepped portions of the first basic structure as stated above, it is preferable that d11 and d12 of the first optical path difference providing structure satisfy respectively the following conditional expressions (6) and (7). More preferably, on the entire region of the central region, the following conditional expressions (6) and (7) are satisfied.

$$0.6 \cdot (\lambda 1/(n-1)) < d11 < 1.5 \cdot (\lambda 1/(n-1)) \quad (6)$$

$$0.6 \cdot (\lambda 1/(n-1)) < d12 < 1.5 \cdot (2\lambda 1/(n-1)) \quad (7)$$

Further, for example, in the case where λ1 is 390 to 415 nm (0.390 to 0.415 μm) and n is 1.54 to 1.60, the above conditional expressions may be expressed as follows.

$$0.39\,\mu m < d11 < 1.15\,\mu m \quad (8)$$

$$0.39\,\mu m < d12 < 1.15\,\mu m \quad (9)$$

It is more preferable that the following conditional expressions (6)' and (7)' are satisfied. Still more preferably, on the entire region of the central region, the following conditional expressions (6)' and (7)' are satisfied.

$$0.9 \cdot (\lambda 1/(n-1)) < d11 < 1.5 \cdot (\lambda 1/(n-1)) \quad (6)'$$

$$0.9 \cdot (\lambda 1/(n-1)) < d12 < 1.5 \cdot (\lambda 1/(n-1)) \quad (7)'$$

Further, for example, in the case where λ1 is 390 to 415 nm (0.390 to 0.415 μm) and n is 1.54 to 1.60, the above conditional expressions may be expressed as follows.

$$0.59\,\mu m < d11 < 1.15\,\mu m \quad (8)'$$

$$0.59\,\mu m < d12 < 1.15\,\mu m \quad (9)'$$

Moreover, in the first basic structure being the (1/1/1) structure, when the wavelength of an incident light flux changes to become longer, a spherical aberration changes in the deficient correction direction (under correction), and in the second basic structure being the (2/1/1) structure, when the wavelength of an incident light flux changes to become longer, a spherical aberration changes in the deficient correction direction (under correction). With the above configuration, when the refractive index of the objective lens changes due to a rise in the temperature of the optical pickup apparatus, a change in the spherical aberration due to the change of the refractive index of the objective lens is corrected by utilizing a phenomenon that the wavelength of the light source rises similarly due to a rise in the environmental temperature, whereby a proper converged-light spot can be formed on the information recording surface of each optical disc. With this, even in the case where an objective lens is made of plastic, it becomes possible to provide an objective lens which can maintain stable performance eve when temperature changes.

It is preferable that as compared with the second basic structure, the contribution rate of the first basic structure is dominant. From the viewpoint that as compared with the second basic structure, the contribution rate of the first basic structure is made dominant, it is preferable that the average pitch of the first basic structure is small as compared with the average pitch of the second basic structure. Further, even in the case where an axial chromatic aberration is made small while maintaining a working distance for a CD and a light source causes superposition of high frequency, in order to form a good light spot and to reduce a problem of stray light in the case where an optical disc has multiple information recording surfaces, it is preferable that in the first optical path difference providing structure, two to five (particularly preferably two to three) ring-shape zones of the first basic structure are included in one ring-shape zone located closest to the optical axis on the second basic structure. It is more preferable that on the entire surface of the first optical path difference providing structure, two to five (particularly preferably two to three) ring-shape zones of the first basic structure are included in one ring-shape zone on the second basic structure. That is, it is preferable that the average pitch of the first basic structure is ⅕ or more and ½ or less (particularly preferably ⅓ or more and ½ or less) of the average pitch of the second basic structure.

Moreover, it is preferable that the axial chromatic aberration of the objective lens is made to 0.3 μm/nm or more and 0.6 μm/nm or less. In order to attain such a configuration, as mentioned above, it is preferable that in the first optical path difference providing structure, two to five (particularly preferably two to three) ring-shape zones of the first basic structure are included in one ring-shape zone located closest to the optical axis on the second basic structure. With the axial chromatic aberration made in the above range, it become possible to reduce a problem of stray light in the case where an optical disc has multiple information recording surfaces, while maintaining a working distance for CD, which is preferable.

It is preferable that a first best focus position where the light intensity of a spot formed by the third light flux having passed through the first optical path difference providing structure is the strongest and a second best focus position where the light intensity of a spot formed by the third light flux is the second strongest satisfy the following conditional expression (10). Meanwhile, the best focus position mentioned in this case indicates a position where a beam waist becomes a minimum in a certain defocusing range. The first best focus position corresponds to a best focus position of necessary light flux used for performing recording and/or reproducing for a CD, and the second best focus position corresponds to a best focus position of a light flux having the largest light quantity among unnecessary light fluxes not used for performing recording and/or reproducing for a CD.

$$0.05 \leq L/f13 \leq 0.35 \quad (10)$$

In the above expression, f13 (mm) represents a focal length of the third light flux that has passed through the first optical path difference providing structure and forms a first best focus, and L (mm) represents a distance between the first best focus and the second best focus.

It is more preferable that the following conditional expression (10)' is satisfied.

$$0.10 \leq L/f13 \leq 0.25 \quad (10)'$$

A preferable example of the first optical path difference providing structure described above is shown in FIG. 6. As a matter of convenience, FIG. 6 shows a configuration that the first optical path difference structure ODS1 is disposed on a flat plate. However, the first optical path difference structure may also be disposed on a convex single lens with an aspheric surface. On the second basic structure BS2 being the (2/1/1) structure, the first basic structure BS1 being the (1/1/1) structure is superimposed. Further, the stepped portions of the second basic structure BS2 face in the direction going to the optical axis OA, and the stepped portions of the first basic structure BS1 face in the direction reverse to the direction going to the optical axis. Furthermore, it turns out that the pitch of the first basic structure BS1 and the pitch of the second basic structure BS2 are adjusted such that the positions of all the stepped portions of the second basic structure are matched with the positions of the stepped portions of the first basic structure. In the present example, $d1=\lambda 1/(n-1)$ holds, and $d2=\lambda 1/(n-1)$ holds. In the present example, when $\lambda 1=405$ nm (0.405 μm) and n=1.5592 hold, $d1=d2=0.72$ μm holds. Moreover, the average pitch of the first basic structure BS1 is smaller as compared with the average pitch of the second basic structure BS2, and the number of stepped portions facing in the direction reverse to the direction going to the optical axis on the first basic structure is more as compared with the number of stepped portions facing in the direction going to the optical axis on the second basic structure.

Next, the second optical path difference providing structure disposed on the intermediate region will be described. It is preferable that the second optical path difference providing structure is configured such that at least two basic structures including the third basic structure and the fourth basic structure are superimposed on each other.

It is preferable that each of the third basic structure and the fourth basic structure is a blaze-type structure. The third basic structure is configured to make a light quantity of the first order diffracted light flux of the first light flux having passed through the third basic structure larger than a light quantity of any other order diffracted light flux, and to make a light quantity of the first order diffracted light flux of the second light flux having passed through the third basic structure larger than a light quantity of any other order diffracted light flux (also referred to as "(1/1) structure"). The fourth basic structure is configured to make a light quantity of the second order diffracted light flux of the first light flux having passed through the fourth basic structure larger than a light quantity of any other order diffracted light flux, and to make a light quantity of the first order diffracted light flux of the second light flux having passed through the fourth basic structure larger than a light quantity of any other order diffracted light flux (also referred to as "(2/1) structure"). With this, in the second optical path difference in which at least the third basic structure and the fourth basic structure are superimposed on each other, an amount of a level difference in the optical axis direction can be reduced, whereby it becomes possible to suppress the lowering of a diffraction efficiency when wavelength changes. Further, the diffraction order of a diffracted light flux having the highest light intensity in the first basic structure conforms to the diffraction order of a diffracted light flux having the highest light intensity in the third basic structure, and the diffraction order of a diffracted light flux having the highest light intensity in the second basic structure conforms to the diffraction order of a diffracted light flux having the highest light intensity in the fourth basic structure. Accordingly, the spherical aberration of the light fluxes passing through the central region and the intermediate region can be made continuous. As a result, it becomes possible to suppress the occurrence of a high order aberration when temperature or wavelength changes.

The second optical path difference providing structure may be configured such that a fifth basic structure is superimposed in addition to the third basic structure and the fourth basic structure. However, in order to make the structure simple, and to suppress the lowering of light utilization efficiency due to manufacturing errors, it is preferable that the second optical path difference providing structure consists of only the third basic structure and the fourth basic structure.

At this time, it is preferable that the fifth basic structure is configured to make a light quantity of the 0th-order diffracted light flux of the first light flux having passed through the fifth basic structure larger than a light quantity of any other order diffracted light flux, to make a light quantity of the 0th-order diffracted light flux of the second light flux having passed through the fifth basic structure larger than a light quantity of any other order diffracted light flux, and to make a light quantity of the Gth-order diffracted light flux of the third light flux having passed through the fifth basic structure larger than a light quantity of any other order diffracted light flux. By superimposing such the fifth basic structure on the other basic structures, it becomes possible to provide only the third light flux with an action to form flare at a position distant from a light spot on the information recording surface of a CD without giving bad influence to the first light flux and the second light flux at the time of passing through the intermediate region of the objective lens and without causing a phase shift at the boundary between the central region and the intermediate region.

It is preferable that G is ±1. When G is ±1, it is preferable that the fifth basic structure is a two-level stairway structure (which is also called a binary structure) as shown in FIG. 3d.

Further, the third basic structure may be configured to make a light quantity of the third order diffracted light flux of the first light flux having passed through the third basic structure larger than a light quantity of any other order diffracted light flux, and to make a light quantity of the second order diffracted light flux of the second light flux having passed through the third basic structure larger than a light quantity of any other order diffracted light flux (also referred to as "(3/2) structure"). The fourth basic structure may be configured to make a light quantity of the second order diffracted light flux of the first light flux having passed through the fourth basic structure larger than a light quantity of any other order diffracted light flux, and to make a light quantity of the first order diffracted light flux of the second light flux having passed through the fourth basic structure larger than a light quantity of any other order diffracted light flux (also referred to as "(2/1) structure"). With such a configuration, the diffraction efficiency in a BD can be enhanced.

In the case where the third basic structure and the fourth basic structure are configured to combine the (1/1) structure and the (2/1) structure, or to combine the (3/2) structure and the (2/1) structure, it is preferable that on at least a part of the third basic structure disposed closest to the central region on the intermediate region, the stepped portions are made to face in the direction reverse to the direction going to the optical axis, and on at least a part of the fourth basic structure disposed closest to the central region on the intermediate region, the stepped portions are made to face in the direction going to the optical axis. More preferably, all the stepped portions on the third basic structure on the intermediate region are made to face in the direction reverse to the direction going to the optical axis, and all the stepped portions on the fourth basic structure on the intermediate region are made to face in the direction going to the optical axis.

In the third basic structure, when the wavelength of an incident light flux changes to become longer, a spherical aberration may be made to change in the deficient correction direction (under correction), and in the fourth basic structure, when the wavelength of an incident light flux changes to become longer, a spherical aberration may be made to change in the deficient correction direction.

With the above configuration, even in the second optical path difference providing structure, when the refractive index of the objective lens changes due to a rise in the temperature of the optical pickup apparatus, a change in the spherical aberration due to the change of the refractive index of the objective lens is corrected by utilizing a phenomenon that the wavelength of the light source rises similarly due to a rise in the environmental temperature, whereby a proper converged-light spot can be formed on the information recording surface of each optical disc.

On the other hand, in one of the third basic structure and the fourth basic structure, when the wavelength of an incident light flux changes to become longer, a spherical aberration may be made to change in the deficient correction direction (under correction), and in the other one, when the wavelength of an incident light flux changes to become longer, a spherical aberration may be made to change in the excessive correction direction (over correction).

The excessive correction (over correction) and the deficient correction (under correction) will be described with reference to FIG. 8. In FIG. 8, an axis of ordinate represents height in the direction perpendicular to the optical axis from the optical axis, and an axis of abscissa represents an aberration. The sign at the left side on the axis of abscissa is negative, and the sign at the right side on the axis of abscissa is positive. The negative sign corresponds to the direction going to the objective lens, and the positive sign corresponds to the direction separating from the objective lens. At this time, the excessive correction corresponds to the state of being inclining in the positive direction like "B" in FIG. 8, and the deficient correction corresponds to the state of being inclining in the negative direction like "A" in FIG. 8. In this connection, although the value of an aberration in B in FIG. 8 is positive, even if the value of an aberration is negative, as long as the inclination inclines in the positive direction like "B", such correction is deemed as the excessive correction. Further, although the value of an aberration in A in FIG. 8 is negative, even if the value of an aberration is positive, as long as the inclination inclines in the negative direction like "A", such correction is deemed as the deficient correction.

In the optical path difference function of the first basic structure and the second basic structure or the third basic structure and the fourth basic structure, when the graph of the optical path difference function is produced with the elimination of only a paraxial term (for example, a term of B2 in Numerical formula 2), if the position of the graph (without relating to the inclination) is located at the negative side, such correction may be deemed as the deficient correction, and if the position is located at the positive side, such correction may be deemed as the excessive correction.

Further, in a longitudinal spherical aberration diagram, it is desirable that in the third basic structure on the intermediate region, when wavelength changes to become longer, the position of a spherical aberration (without relating to the inclination) is located at the positive side, and in the fourth basic structure, when wavelength changes to become longer, the position of a spherical aberration is located at the negative side. With such a configuration, it becomes possible to make a chromatic aberration (a shift in light-converged position when wavelength changes) of a BD smaller.

It is preferable to configure such that in one of the third basic structure and the fourth basic structure, when the wavelength of an incident light flux changes to become longer, a spherical aberration may be made to change in the deficient correction direction (under correction), and in the other one, when the wavelength of an incident light flux changes to become longer, a spherical aberration may be made to change in the excessive correction direction (over correction), because, when the first light flux is converged on the information recording surface of a BD via the whole objective lens, if the wavelength of the first light flux changes by +5 nm, an amount of a change of the third order spherical aberration can be made to −30 mλ rms or more and +50 mλ rms or less. Further, it is more preferable that when the first light flux is converged on the information recording surface of a BD via the whole objective lens, if the wavelength of the first light flux changes by +5 nm, an amount of a change of the third order spherical aberration is made to −10 mλ rms or more and +10 mλ rms or less. Furthermore, it is preferable that in the case where the first light flux is converged on the information recording surface of a BD via the whole objective lens, when the wavelength of the first light flux changes by +5 nm, an amount of a change of the fifth order spherical aberration is made to −20 mλ rms or more and +20 mλ rms or less. More preferably, an amount of change of the fifth order spherical aberration is made to −10 mλ rms or more and +10 mλ rms or less.

With such a configuration, in one of the third basic structure and the fourth basic structure, when the wavelength of an incident light flux changes to become longer, since a spherical aberration changes in the excessive correction direction, even if the second optical path difference providing structure consists of only the third basic structure and the fourth basic structure, it becomes possible to perform easily to form flare at the time of use of a CD. Accordingly, since the formation of flare at the time of use of the CD can be achieved by the second optical path difference providing structure with a simple configuration, it becomes possible to suppress the lowering of light utilization efficiency due to a shadow effect, and further also to suppress the lowering of light utilization efficiency due to manufacturing errors. As a result, the light utilization efficiency can be enhanced. Further, with this, in the intermediate region, the temperature characteristic correction effect at the time of use of the BD becomes small. However, in the first basic structure and the second basic structure on the central region, when wavelength changes to become longer, correction becomes deficient. Accordingly, it becomes possible to prevent the temperature characteristic from becoming too bad, and to increase the wavelength characteristic correction effect at the time of use of the BD. In addition, at the time of use of a DVD, both the temperature characteristic and the wavelength characteristic of the DVD can be made good.

It is preferable to configure such that in the fourth basic structure, when the wavelength of an incident light flux changes to become longer, a spherical aberration is made to change in the deficient correction direction (under correction), and in the third basic structure, when the wavelength of an incident light flux changes to become longer, a spherical aberration is made to change in the excessive correction direction (over correction), because it become easy to make flare fly more far away at the time of use of a CD.

It is preferable that in the second optical path difference providing structure, one to three (particularly preferably two to three) ring-shape zones of the third basic structure are included in one ring-shape zone located closest to the central region on the fourth basic structure. It is more preferable that on the entire surface of the second optical path difference providing structure, one to three (particularly preferably two to three) ring-shape zones of the third basic structure are included in one ring-shape zone on the fourth basic structure. That is, it is preferable that the average pitch of the third basic structure is equal to or ½ or less (particularly preferably ⅓ or more and ½ or less) of the average pitch of the fourth basic structure.

Next, in the case where the third optical path difference providing structure is disposed in the peripheral region, an arbitrary optical path difference providing structure may be disposed. The third optical path difference providing structure preferably includes a sixth basic structure. The sixth basic structure is configured to make a light quantity of the P-th order diffracted light flux of the first light flux having passed through the sixth basic structure larger than a light quantity of any other order diffracted light flux, to make a light quantity of the Q-th order diffracted light flux of the second light flux having passed through the sixth basic structure larger than a light quantity of any other order diffracted light flux, and to make a light quantity of the R-th order diffracted light flux of the third light flux having passed through the sixth basic structure larger than a light quantity of any other order diffracted light flux. In order to suppress the fluctuation of diffraction efficiency when wavelength changes, the value of P is preferably 5 or less.

It is assumed that NA1 represents a numerical aperture of the objective lens on the image side which is needed for reproducing and/or recording information for a BD; NA2 (NA1>NA2) represents a numerical aperture of the objective lens on the image side that is needed for reproducing and/or recording information for a DVD; and NA3 (NA2>NA3) represents a numerical aperture of the objective lens on the image side that is needed for reproducing and/or recording information for a CD. NA1 is preferably 0.75 or more and 0.9 or less, and more preferably 0.8 or more and 0.9 or less. NA1 is particularly preferably 0.85. NA2 is preferably 0.55 or more and 0.7 or less. Na2 is particularly preferably 0.60 or 0.65. Further, NA3 is preferably 0.4 or more and 0.55 or less. Na3 is particularly preferably 0.45 or 0.53.

It is preferable that a boundary between the central region and the intermediate region of the objective lens is formed on a portion that corresponds to a range from 0.9·NA3 or more to 1.2·NA3 or less (more preferably, 0.95·NA3 or more to 1.15·NA3 or less) at the time of use of the third light flux. More preferably, the boundary between the central region and the intermediate region is formed on a portion corresponding to NA3. Further, it is preferable that a boundary between the intermediate region and the peripheral region of the objective lens is formed on a portion that corresponds to a range from 0.9·NA2 or more to 1.2·NA2 or less (more preferably, 0.95·NA2 or more to 1.15·NA2 or less) at the time of use of the second light flux. More preferably, the boundary between the intermediate region and the peripheral region of the objective lens is formed on a portion corresponding to NA2.

When the third light flux that has passed through the objective lens is converged on the information recording surface of a CD, it is preferable that a spherical aberration has at least one discontinuous portion. In that case, it is preferable that the discontinuous portion exists in a range from 0.9·NA3 or more to 1.2·NA3 or less (more preferably, 0.95·NA3 or more to 1.15·NA3 or less) at the time of use of the third light flux.

The objective lens preferably satisfies the following conditional expression (12).

$$0.8 \leq d/f \leq 1.5 \quad (12)$$

In the above expression, d represents a thickness (mm) of the objective lens on the optical axis, and f represents a focal length of the objective lens for the first light flux.

In the case of adaptation to optical discs designed for use with a high NA and a short wavelength such as BDs, there are problems that, in the objective lens, astigmatism tends to occur, and also an eccentric comatic aberration also tends to occur. However, the satisfaction of the conditional expression (12) enables to suppress the occurrence of the astigmatism and the eccentric comatic aberration.

Further, since the objective lens becomes a thick objective lens with a thick axial thickness, a working distance at the time of performing recording and/or reproducing for a CD tends to become short. Accordingly, it is preferable not to exceed the upper limit of the conditional expression (12).

Each of the first light flux, the second light flux, and the third light flux may enter the objective lens as a parallel light flux, or may enter the objective lens as a divergent light flux or a convergent light flux. In order to prevent occurrence of a coma aberration even at the time of a tracking operation, it is preferable that each of the first light flux, the second light flux and the third light flux is made to enter the objective lens as a parallel light flux or an approximately parallel light flux. By employing the first optical path difference providing structure of the present invention, it become possible to make each of the first light flux, the second light flux, and the third light flux enter the objective lens as a parallel light flux or an approximately parallel light flux, whereby the effect of the present invention becomes more remarkable. In the case where the first light flux becomes a parallel light flux or an approximately parallel light flux, it is preferable that the image formation magnification m1 of the objective lens when the first light flux enters the objective lens satisfies the following conditional expression (13).

$$-0.01 < m1 < 0.01 \quad (13)$$

Further, in the case where the second light flux enters the objective lens as a parallel light flux or an approximately parallel light flux, it is preferable that the image formation magnification m2 of the objective lens when the second light flux enters the objective lens satisfies the following conditional expression (14).

$$-0.01 < m2 < 0.01 \quad (14)$$

On the other hand, in the case where the second light flux enters the objective lens as a divergent light flux, it is preferable that the image formation magnification m2 of the objective lens when the second light flux enters the objective lens satisfies the following conditional expression (14)'.

$$-0.025 < m2 \leq -0.01 \quad (14)'$$

Further, in the case where the third light flux enters the objective lens as a parallel light flux or an approximately parallel light flux, it is preferable that the image formation magnification m3 of the objective lens when the third light flux enters the objective lens satisfies the following conditional expression (15).

$$-0.01 < m3 < 0.01 \quad (15)$$

On the other hand, in the case where the third light flux enters the objective lens as a divergent light flux, it is preferable that the image formation magnification m3 of the objective lens when the third light flux enters the objective lens satisfies the following conditional expression (15)'.

$$-0.025 < m2 \leq -0.01 \quad (15)'$$

Further, it is preferable that the working distance (WD) of the objective lens at the time of use of the third optical disc is 0.15 mm or more and 1.5 mm or less, and preferably 0.2 mm or more and 0.5 mm or less. Next, it is preferable that the working distance (WD) of the objective lens at the time of use of the second optical disc is 0.2 mm or more and 1.3 mm or less. Furthermore, it is preferable that the working distance (WD) of the objective lens at the time of use of the first optical disc is 0.25 mm or more and 1.0 mm or less.

The optical pickup apparatus may be configured to make at least the first light flux and the second light flux to pass through a coupling lens and to include an actuator to move the coupling lens in the optical axis direction. In particular, in the case where a BD has a plurality of information recording surfaces such as two layers or three layers or more, when an operation for performing recording and/or reproducing for a certain layer is shifted to another operation for performing recording and/or reproducing for another layer, a difference is caused in thickness of a transparent substrate. Accordingly, it becomes necessary to correct a spherical aberration which occurs due to the difference in thickness. It may be considered to correct the occurring spherical aberration by moving the coupling lens in the optical axis direction so as to change the magnification of the objective lens. Further, also, a spherical aberration which occurs when temperature or wavelength changes, can be corrected by moving the coupling lens in the optical axis direction so as to change the magnification of the objective lens.

However, even in the optical pickup apparatus configured to correct various spherical aberrations by moving the coupling lens in the optical axis direction at the time of use of a BD, it is preferable to fix the position of the coupling lens on the optical axis at the time of use of a DVD.

The reasons why are as follows. According to one reason, although flare does not occur at the time of use of a BD, flare occurs at the time of use of a DVD. Accordingly, the movement of the coupling lens changes the aberration of the flare, which results to cause the possibility that the flare may influence adversely recording and/or reproducing. According to another reason, there is a desire to place always the initial position of the coupling lens at a constant position in order to discriminate the type of a DVD. According to still another reason, there is a simple desire to reduce the cost, as much as possible, for firmware to move the coupling lens in a driving mechanism.

In order to fix the position of the coupling lens on the optical axis at the time of use of a DVD, it is preferable to configure such that in one of the third basic structure and the fourth basic structure which constitute the second optical path difference providing structure of the objective lens, when the wavelength of an entering light flux changes to become longer, a spherical aberration changes in a deficient correction direction, and in the other one, when the wavelength of an entering light flux changes to become longer, a spherical aberration changes in an excessive correction direction. The reason is that both the temperature characteristic and the wavelength characteristic at the time of use of a DVD can be made good. As a result, at the time of use of a DVD, even on the condition that the position of the coupling lens in the optical axis direction is fixed when the second light flux passes through, it becomes possible to perform recording and/or reproducing information for the information recording surface of a DVD.

An optical information recording and reproducing apparatus according to the present invention includes an optical disc driving apparatus including the above optical pickup apparatus.

Here, the optical disc driving apparatus installed in the optical information recording and reproducing apparatus will be described. The following two types are available for the optical disc driving apparatus. In one type, only a tray capable of holding an optical disc is taken out, on the state that an optical disc is mounted, from the main body of the optical information recording and reproducing apparatus in which the optical pickup apparatus is installed. In another type, the main body of the optical disc driving apparatus in which the optical pickup apparatus is installed is taken out to the outside.

The optical information recording and reproducing apparatus capable of employing any one of the above types includes generally the following structural members; such as an optical pickup apparatus accommodated in a housing; a driving source of the optical pickup apparatus such as a seek-motor configured to move the optical pickup apparatus together with the housing toward the inner periphery or outer periphery of an optical disc; a shifting means of the optical pickup apparatus having a guide rail for guiding the housing of the optical pickup apparatus toward the inner periphery or outer periphery of the optical disc; and a spindle motor for driving the rotation of the optical disc. However, the structural members of the optical information recording and reproducing apparatus should not be limited to the above structural members.

In addition to the above structural members, it is preferable that in the former type, there are provided a tray capable of holding an optical disc on the state that the optical disc is mounted and a loading mechanism to slide the tray, and in the latter type, there is provided a drawer, corresponding to chassis, capable of drawing respective structural members to the outside without providing the tray and the loading mechanism.

Effect of Invention

According to the present invention, even in a thick objective lens with a thick axial thickness which is used for achieving compatibility for three types of optical discs of BDs, DVDs, and CDs, it becomes possible to make the temperature characteristic good while securing a sufficient working distance at the time of use of a CD. Further, it becomes possible to suppress the height of stepped portions of an optical path difference providing structure so as not to become high. Together with this, it becomes possible to suppress a loss of light quantity caused by manufacturing errors, and to suppress the fluctuation of diffraction efficiency when wavelength fluctuates. Furthermore, it becomes possible to provide an objective lens with well-balanced light utilizing efficiency capable of maintaining high light utilization efficiency for any one of the three types of optical discs of BDs, DVDs, and CDs. With these effects, it becomes possible to perform recording and/or reproducing for the three types of optical discs of BDs, DVDs, and CDs in good order with a common objective lens.

EMBODIMENT FOR CARRYING OUT THE INVENTION

Figure 7:
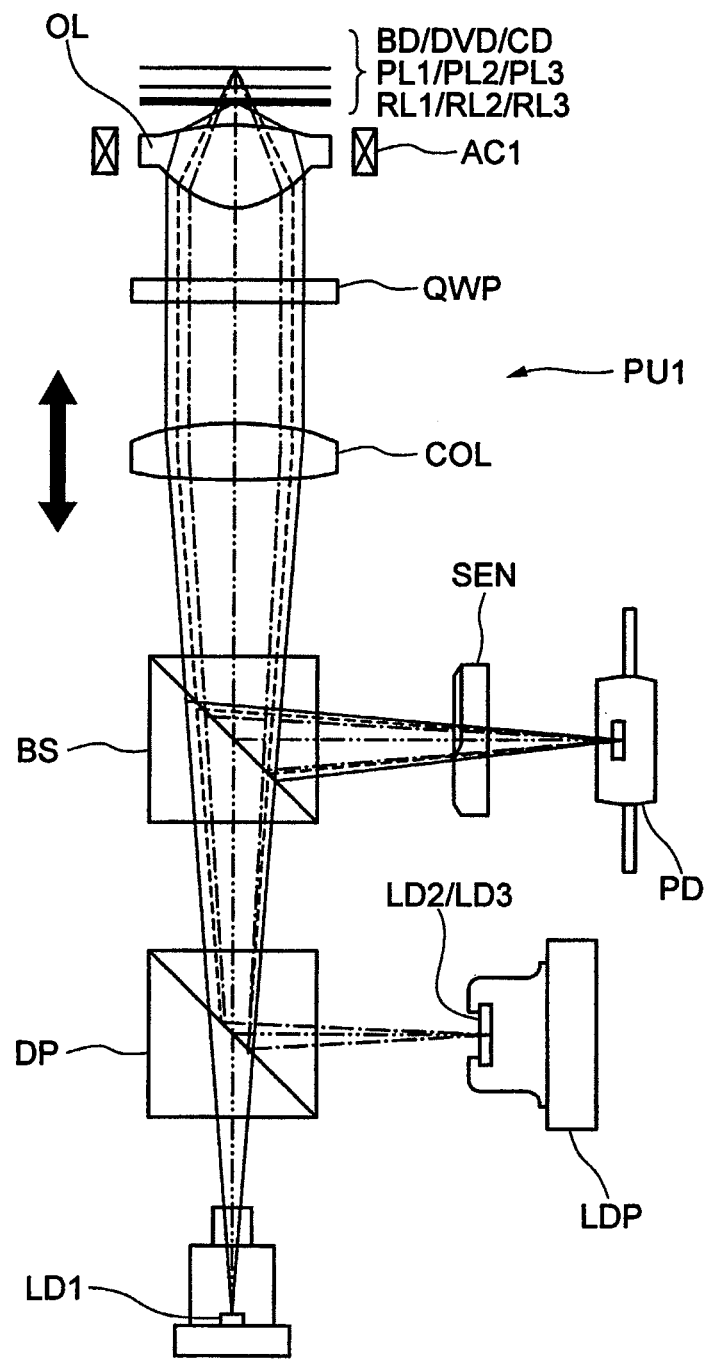
FIG. 7 is a diagram illustrating an outline of an optical pickup apparatus PU1 of the present embodiment capable of performing recording and/or reproducing information properly for a BD, DVD and CD being different in the type of an optical disc.
Figure 8:
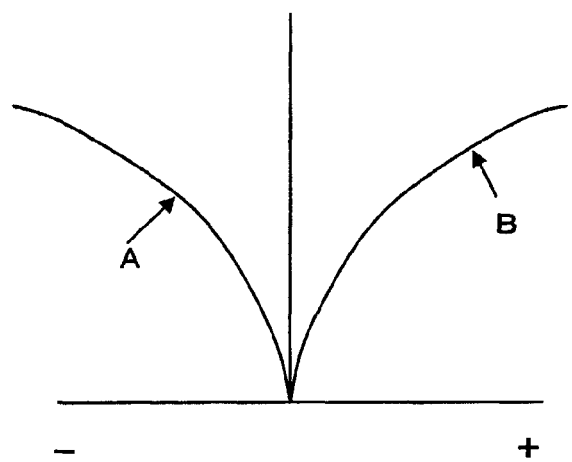
FIG. 8 is a diagram illustrating whether an aberration is in under correction (deficient correction) or over correction (excessive correction).

Hereinafter, preferred embodiments of the present invention will be described with reference to the drawings. FIG. 7 is a diagram illustrating an outline of an optical pickup apparatus PU1 of the present embodiment capable of performing recording and/or reproducing information properly for a BD, DVD and CD being different in the type of an optical disc. Such an optical pickup apparatus PU1 can be mounted in an optical information recording and reproducing apparatus. In this regard, the present invention should not be limited to the present embodiments.

The optical pickup apparatus PU1 includes an objective lens OL, a λ/4 (quarter) wavelength plate QWP, a collimator lens COL, a polarization beam splitter BS, a dichroic prism DP, a laser unit LDP in which a first semiconductor laser LD1 (first light source), a second semiconductor laser LD2 (second light source), and a third semiconductor laser LD3 (third light source) are integrated in a single body, a sensor lens SEN, and a light receiving element PD as a photodetector. The first semiconductor laser LD1 is configured to emit a laser light flux (first light flux) with a wavelength $\lambda 1=405$ nm at the time of performing recording and/or reproducing information for a BD, the second semiconductor laser LD2 is configured to emit a laser light flux (second light flux) with a wavelength $\lambda 2=660$ nm at the time of performing recording and/or reproducing information for a DVD and, and the third semiconductor laser LD3 is configured to emit a laser light flux (third light flux) with a wavelength $\lambda 3=785$ nm at the time of performing recording and/or reproducing information for a CD.

Figure 1:
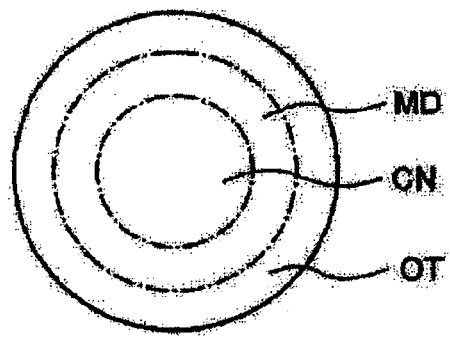
FIG. 1 is a view showing an objective lens OL being a single lens according to the present embodiment when viewing in the optical axis direction.
Figure 2:
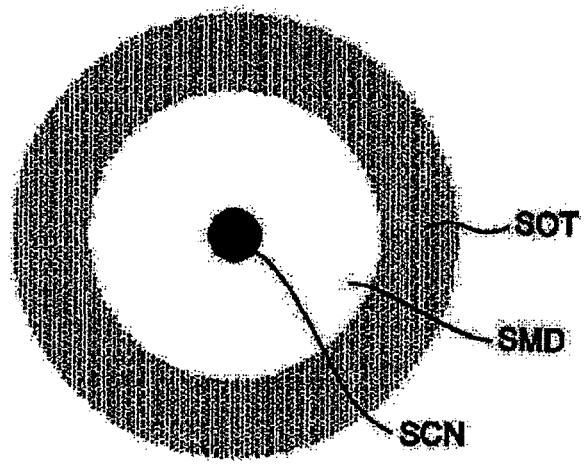
FIG. 2 is a diagram illustrating the state that a third light flux having passed through the objective lens forms a spot on an information recording surface of a third optical disc.
Figure 3:
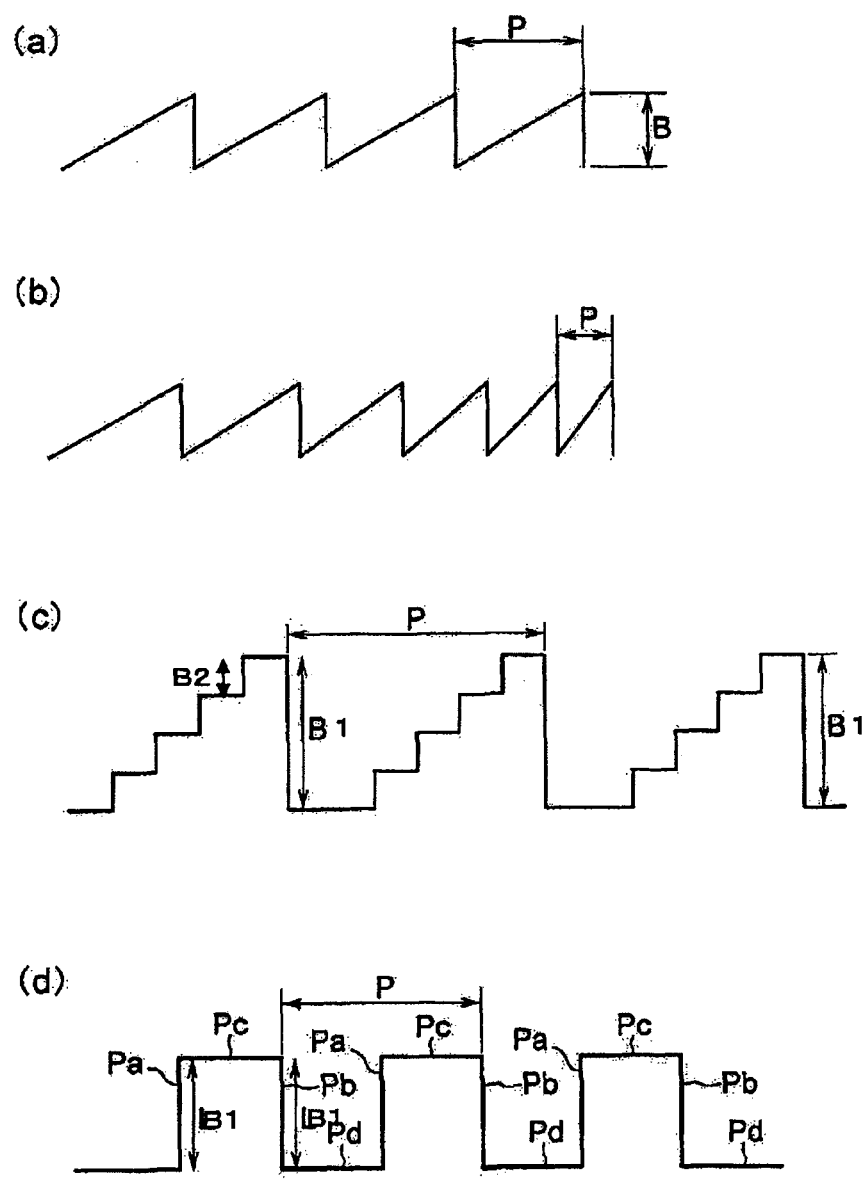
FIGS. 3a to 3d each is a sectional view which is taken along an axis line direction and shows an example of an optical path difference providing structure, FIGS. 3a and 3b each shows an example of a blaze-type structure, and FIGS. 3c and 3d each shows a stairway type structure.
Figure 4:
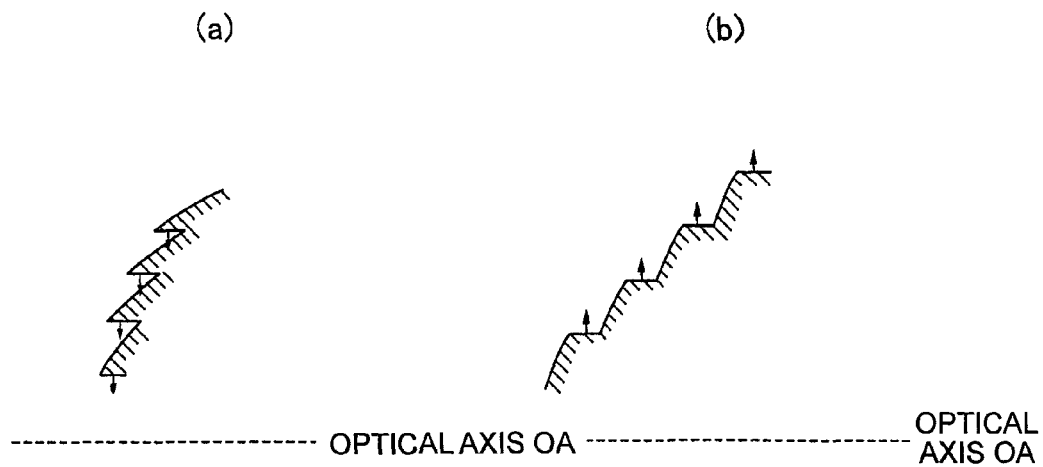
FIG. 4a is a diagram illustrating the state that stepped portions face in the direction going to the optical axis.
FIG. 4b is a diagram illustrating the state that stepped portions face in the direction reverse to the direction going to the optical axis.
Figure 5:
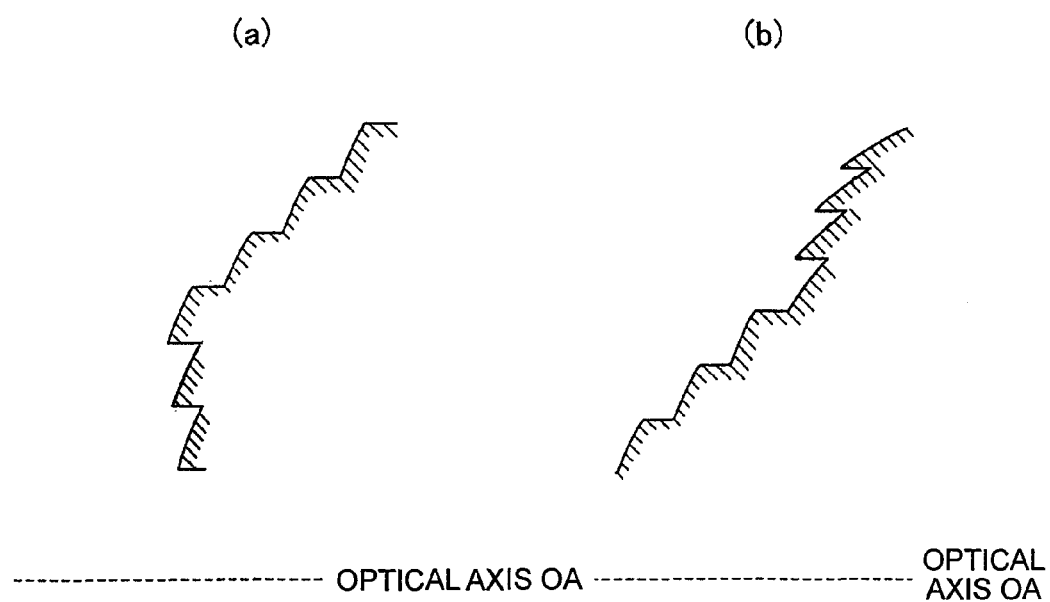
FIG. 5a is a diagram illustrating the configuration that although stepped portions face in the direction going to the optical axis in the vicinity of the optical axis, the orientation is switched over on the way, and in the vicinity of the intermediate region, stepped portions face in the direction reverse to the direction going to the optical axis.
FIG. 5b is a diagram illustrating the configuration that although stepped portions face in the direction reverse to the direction going to the optical axis in the vicinity of the optical axis, the orientation is switched over on the way, and in the vicinity of the intermediate region, stepped portions face in the direction going to the optical axis.
Figure 6:
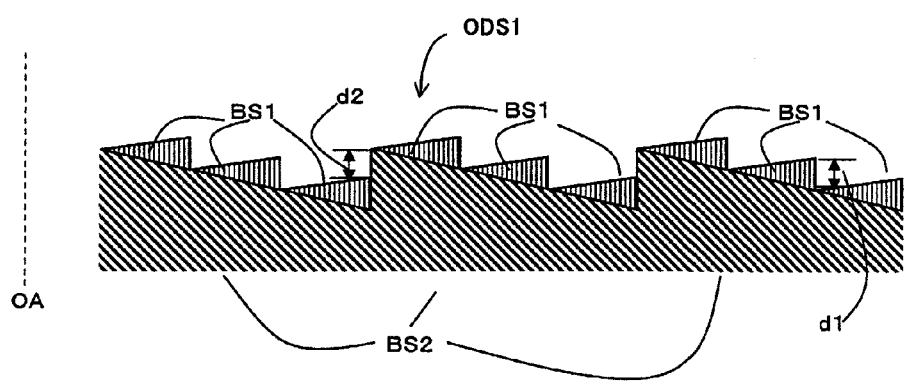
FIG. 6 is a schematic diagram illustrating a first optical path difference providing structure.

As shown in FIG. 1, in the objective lens OL being a single lens according to the present embodiment, a central region CN including an optical axis, an intermediate region MD arranged around the central region CN, and a peripheral region OT arranged around the intermediate region MD are formed concentrically around a center formed by the optical axis on a light source-side aspheric optical surface. Although not shown in the drawings, the above-mentioned first optical path difference providing structure is formed on the central region CN, and the above-mentioned second optical path difference providing structure is formed on the intermediate region MD. Further, on the peripheral region OT, the third optical path difference providing structure is formed. In the present embodiment, the third optical path difference providing structure is a blaze-type diffractive structure. Furthermore, the objective lens of the present embodiment is a plastic lens. As shown in FIG. 6, the first optical path difference providing structure formed on central region CD has a structure in which the first basic structure and the second basic structure are superimposed on each other. The first basic structure is configured to make a light quantity of the first order diffracted light flux of the first light flux having passed through the first basic structure larger than a light quantity of any other order diffracted light flux, to make a light quantity of the first order diffracted light flux of the second light flux having passed through the first basic structure larger than a light quantity of any other order diffracted light flux, and to make a light quantity of the first order diffracted light flux of the third light flux having passed through the first basic structure larger than a light quantity of any other order diffracted light flux. Stepped portions disposed on at least a part of the first basic structure arranged in the vicinity of the optical axis on the central region CN face in the direction reverse to the direction going to the optical axis. The second basic structure is configured to make a light quantity of the second order diffracted light flux of the first light flux having passed through the second basic structure larger than a light quantity of any other order diffracted light flux, to make a light quantity of the first order diffracted light flux of the second light flux having passed through the second basic structure larger than a light quantity of any other order diffracted light flux, and to make a light quantity of the first order diffracted light flux of the third light flux having passed through the second basic structure larger than a light quantity of any other order diffracted light flux. Stepped portions disposed on at least a part of the second basic structure arranged in the vicinity of the optical axis on the central region CN face in the direction going to the optical axis. In the first basic structure and the second basic structure, when the wavelength of an entering light flux changes to become longer, a spherical aberration changes in a deficient correction direction.

The divergent light flux of a first light flux ($\lambda 1$=405 nm) emitted from the blue-violet semiconductor laser LD1, as illustrated with solid lines, passes through the dichroic prism DP, passes through the polarization beam splitter BS, and then passes through the collimator lens COL, thereby being made to a parallel light flux. Subsequently, the light flux is converted from a linearly polarized light flux to a circularly polarized light flux by the $\lambda/4$ wavelength plate QWP. Then, the diameter of the resulting light flux is regulated by a not-shown stop, and the light flux enters the objective lens OL. AT this time, the light flux converged by the central region, the intermediate region, and the peripheral region of the objective lens OL becomes a spot formed on the information recording surface RL1 of a BD via a protective substrate PL1.

The reflected light flux modulated by information pits on the information recording surface RL1 passes again the objective lens OL and the not-shown stop, and is converted from the circularly polarized light flux to a linearly polarized light flux by the $\lambda/4$ wavelength plate QWP, made to a converged light flux by the collimator lens COL, reflected on the polarization beam splitter BS, and converged on the light receiving surface of the light receiving element PD through the sensor lens SEN. Then, the information recorded in the BD can be read out by performing focusing and tracking operations for the objective lens OL with the biaxial actuator AC1 by using the output signals of the light receiving element PD. Here, when wavelength fluctuation occurs in the first light flux, or when an operation for recording and/or reproducing is performed for a BD including a plurality of information recording layers, the collimator lens COL as a magnification changing means is moved in the direction along the optical axis so as to change the divergent angle or convergent angle of a light flux entering the objective lens OL, whereby a spherical aberration occurring due to the wavelength fluctuation or a different information recording layer can be corrected.

The divergent light flux of a second light flux ($\lambda 2$=660 nm) emitted from the semiconductor laser LD2 of the laser unit LDP, as illustrated with dotted lines, is reflected on the dichroic prism DP, and then passes through the polarization beam splitter BS and the collimator lens COL. Subsequently, the light flux is converted from a linearly polarized light flux to a circularly polarized light flux by the $\lambda/4$ wavelength plate QWP, and then the resulting light flux enters the objective lens OL. AT this time, the light flux converged by the central region and the intermediate region of the objective lens OL becomes a spot formed on the information recording surface RL2 of a DVD via a protective substrate PL2 and forms a central spot portion (a light flux having passed through the peripheral region is made to flare and forms a peripheral spot portion).

The reflected light flux modulated by information pits on the information recording surface RL2 passes again the objective lens OL, and then is converted from the circularly polarized light flux to a linearly polarized light flux by the $\lambda/4$ wavelength plate QWP, made to a converged light flux by the collimator lens COL, reflected on the polarization beam splitter BS, and converged on the light receiving surface of the light receiving element PD through the sensor lens SEN. Then, the information recorded in the DVD can be read out by using the output signals of the light receiving element PD.

The divergent light flux of a third light flux ($\lambda 3$=785 nm) emitted from the semiconductor laser LD3 of the laser unit LDP, as illustrated with one dot chain lines, is reflected on the dichroic prism DP, and then passes through the polarization beam splitter BS and the collimator lens COL. Subsequently, the light flux is converted from a linearly polarized light flux to a circularly polarized light flux by the $\lambda/4$ wavelength plate QWP, and then the resulting light flux enters the objective lens OL. AT this time, the light flux converged by the central region of the objective lens OL becomes a spot formed on the information recording surface RL3 of a CD via a protective substrate PL3 (a light flux having passed through the intermediate region and the peripheral region is made to flare and forms a peripheral spot portion).

The reflected light flux modulated by information pits on the information recording surface RL3 passes again the objective lens OL, and is converted from the circularly polarized light flux to a linearly polarized light flux by the $\lambda/4$ wavelength plate QWP, made to a converged light flux by the collimator lens COL, reflected on the polarization beam splitter BS, and converged on the light receiving surface of the light receiving element PD through the sensor lens SEN. Then, the information recorded in the CD can be read out by using the output signals of the light receiving element PD.

EXAMPLES

Next, examples which can be used for the above described embodiment will be described. Hereinafter (including lens data in tables), the power of 10 may be expressed by using "E" (For example, 2.5×10⁻³ is expressed as 2.5E-3). Each optical surface of the objective lens is formed as an aspheric surface which is symmetrical around the optical axis and defined by a mathematical expression in which the value of each coefficient shown in tables is substituted into a numerical expression (1).

$$X(h) = \frac{(h^2/r)}{1+\sqrt{1-(1+\kappa)(h/r)^2}} + \sum_{i=0}^{10} A_{2i}h^{2i}$$ [Numerical Expression 1]

Herein, X(h) represents an axis in the optical axis direction (the advancing direction of light is defined as a positive sign), κ represents the coefficient of a cone, $A_i$ represents the coefficient of an aspheric surface, h represents a height from the optical axis, and r represents a paraxial curvature radius.

Further, in the case of an example employing a diffractive structure, an optical path difference provided by the diffractive structure to a light flux of each wavelength is defined by a mathematical expression in which the value of each coefficient shown in tables is substituted into a numerical expression (2).

$$\Phi = m\lambda \Sigma B_{2i}h^{2i}$$ [Numerical Expression 2]

(Unit: mm)

In the above expression, h represents a height from the optical axis, λ represents the wavelength of an incident light flux (an entering light flux), m represents a diffraction order, and $B_{2i}$ represents the coefficient of the optical path difference function.

Example 1

The objective lens of Example 1 is a plastic single lens. The conceptual diagram of the first optical path difference providing structure of Example 1 is shown in FIG. 6. (FIG. 6 is merely a conceptual diagram different from the actual configuration of Example 1.) The first optical path difference providing structure of Example 1 is configured to be an optical path difference providing structure in which the first basic structure BS1 being a blaze type diffractive structure of the (1/1/1) structure is superimposed onto the second basic structure BS2 being a blaze type diffractive structure of the (2/1/1) structure on the entire region of the central region. Further, the stepped portions on the second basic structure BS2 face in the direction going to the optical axis OA, and the stepped portions on the first basic structure BS1 face in the direction reverse to the direction going to the optical axis OA. Further, the average pitch of the first basic structure BS1 is small as compared with the average pitch of the second basic structure BS2, and the number of stepped portions facing in the direction reverse to the direction going to the optical axis on the first basic structure is more as compared with the number of stepped portions facing in the direction going to the optical axis on the second basic structure. In the first basic structure BS1 and the second basic structure BS2, when the wavelength of an entering light flux changes to become longer, a spherical aberration changes in the deficient correction direction.

Further, the second optical path difference providing structure of Example 1 is configured to be an optical path difference providing structure in which the third basic structure same with the first basic structure and the fourth basic structure same with the second basic structure are superimposed on each other on the entire region of the intermediate region, and further the fifth basic structure is superimposed. The stepped portions on the third basic structure face in the direction reverse to the direction going to the optical axis, and the stepped portions on the fourth basic structure face in the direction going to the optical axis. In the third basic structure and the fourth basic structure, when the wavelength of an entering light flux changes to become longer, a spherical aberration changes in the deficient correction direction. The fifth basic structure of Example 1 is a two-stepped stairway type diffractive structure (a binary structure) configured to make a light quantity of the 0-th order diffracted light flux of the first light flux having passed through the fifth basic structure larger than a light quantity of any other order diffracted light flux, to make a light quantity of the 0-th order diffracted light flux of the second light flux having passed through the fifth basic structure larger than a light quantity of any other order diffracted light flux, and to make a light quantity of the ± first order diffracted light flux of the third light flux having passed through the fifth basic structure larger than a light quantity of any other order diffracted light flux.

The third optical path difference providing structure of Example 1 consists of only the sixth basic structure. The sixth basic structure is a blaze type diffractive structure configured to make a light quantity of the second order diffracted light flux of the first light flux having passed through the sixth basic structure larger than a light quantity of any other order diffracted light flux, to make a light quantity of the first order diffracted light flux of the second light flux having passed through the sixth basic structure larger than a light quantity of any other order diffracted light flux, and to make a light quantity of the first order diffracted light flux of the third light flux having passed through the sixth basic structure larger than a light quantity of any other order diffracted light flux.

The lens data of Example 1 are shown in Table 1.

TABLE 1

| [EXAMPLE 1] | | | | | | | |
|---|---|---|---|---|---|---|---|
| FOCAL LENGTH OF OBJECTIVE LENS | | $f_1$ = 2.20 mm | | $f_2$ = 2.38 mm | | $f_3$ = 2.45 mm | |
| NUMERICAL APERTURE | | NA1: 0.85 | | NA2: 0.60 | | NA3: 0.47 | |
| MAGNIFICATION | | m1: 0 | | m2: 0 | | m3: 0 | |
| i-TH SURFACE | ri | di(405 nm) | ni(405 nm) | di(660 nm) | ni(660 nm) | di(785 nm) | ni(785 nm) |
| 0 | | ∞ | | ∞ | | ∞ | |
| 1(STOP DIAMETER) | | 0.0(φ3.74 mm) | | 0.0(φ2.87 mm) | | 0.0(φ2.30 mm) | |
| 2-1 | 1.3099 | 2.670 | 1.5414 | 2.670 | 1.5225 | 2.670 | 1.5193 |
| 2-2 | 1.5097 | | | | | | |
| 2-3 | 1.4723 | | | | | | |

TABLE 1-continued

[EXAMPLE 1]

| | | | | | | | | |
|---|---|---|---|---|---|---|---|---|
| 3 | −2.3669 | 0.721 | | 0.646 | | 0.359 | | |
| 4 | ∞ | 0.0875 | 1.6196 | 0.600 | 1.5773 | 1.200 | 1.5709 | |
| 5 | ∞ | | | | | | | |

| | | SURFACE NO. | | | |
|---|---|---|---|---|---|
| | | 2-1 | 2-2 | 2-3 | 3 |
| | REGION | h ≤ 1.180 | 1.180 ≤ h ≤ 1.45 | 1.45 ≤ h ≤ 1.87 | |
| ASPHERIC SURFACE COEFFICIENT | κ | −8.7226E−01 | −3.7413E−01 | −5.9930E−01 | −3.3091E+01 |
| | A0 | 0.0000E+00 | 2.4521E−02 | 2.2268E−02 | 0.0000E+00 |
| | A4 | 7.9383E−03 | 2.3786E−02 | 1.9406E−02 | 1.0060E−01 |
| | A6 | 5.4165E−03 | −1.8940E−03 | −1.0124E−04 | −9.9722E−02 |
| | A8 | 3.1408E−04 | −3.0942E−04 | 2.4046E−03 | 7.7657E−02 |
| | A10 | −1.3516E−03 | −2.2047E−03 | −1.5974E−03 | −4.3120E−02 |
| | A12 | 5.1208E−04 | 5.9886E−04 | 2.3273E−04 | 1.4491E−02 |
| | A14 | 7.0800E−04 | 3.2379E−04 | 2.3920E−04 | −2.5798E−03 |
| | A16 | −7.9609E−04 | −2.2751E−04 | −1.6547E−04 | 1.8060E−04 |
| | A18 | 3.2163E−04 | 8.4526E−05 | 4.5018E−05 | 0.0000E+00 |
| | A20 | −4.3814E−05 | −1.5640E−05 | −4.6358E−06 | 0.0000E+00 |
| FIRST OPTICAL PATH DIFFERENCE FUNCTION | DIFFRACTION ORDER m | 1/1/1 | 1/1/1 | 2/1/1 | |
| | B2 | 6.3821E+01 | 6.4208E+01 | 1.4185E+01 | |
| | B4 | −6.0360E+00 | −6.3479E+00 | 1.7360E+00 | |
| | B6 | 3.1232E+00 | 2.4210E+00 | −1.7979E−01 | |
| | B8 | −1.3062E+00 | −5.1565E−01 | −1.0132E−01 | |
| | B10 | 2.5156E−01 | 5.8699E−02 | −4.6009E−02 | |
| SECOND OPTICAL PATH DIFFERENCE FUNCTION | DIFFRACTION ORDER m | 2/1/1 | 2/1/1 | — | |
| | B2 | −7.6263E+00 | −7.6722E+00 | — | |
| | B4 | −3.7264E+00 | −4.1548E+00 | — | |
| | B6 | 1.5761E+00 | 1.4111E+00 | — | |
| | B8 | −9.7167E−01 | −3.8603E−01 | — | |
| | B10 | 2.3713E−01 | 7.2573E−02 | — | |
| THIRD OPTICAL PATH DIFFERENCE FUNCTION | DIFFRACTION ORDER m | — | 0/0/1 | — | |
| | B2 | — | −9.4827E+01 | — | |
| | B4 | — | 1.9720E+02 | — | |
| | B6 | — | −1.5525E+02 | — | |
| | B8 | — | 5.5362E+01 | — | |
| | B10 | — | −7.4420E+00 | — | |

According to the wavelength characteristic in the BD of Example 1, when the wavelength of the light source changes by +5 nm, the third order spherical aberration is −105 mλ rms, and the fifth order spherical aberration is −24 mλ rms. These aberrations can be improved by the magnification correction. Herein, the magnification correction means a magnification correction made by moving a collimator.

Example 2

The objective lens of Example 2 is a plastic single lens. The conceptual diagram of the first optical path difference providing structure of Example 1 is similar to that shown in FIG. 6. The first optical path difference providing structure of Example 1 is configured to be an optical path difference providing structure in which the first basic structure BS1 being a blaze type diffractive structure of the (1/1/1) structure is superimposed onto the second basic structure BS2 being a blaze type diffractive structure of the (2/1/1) structure on the entire region of the central region. Further, the stepped portions on the second basic structure BS2 face in the direction going to the optical axis OA, and the stepped portions on the first basic structure BS1 face in the direction reverse to the direction going to the optical axis OA. Further, the average pitch of the first basic structure BS1 is small as compared with the average pitch of the second basic structure BS2, and the number of stepped portions facing in the direction reverse to the direction going to the optical axis on the first basic structure is more as compared with the number of stepped portions facing in the direction going to the optical axis on the second basic structure. In the first basic structure BS1 and the second basic structure BS2, when the wavelength of an entering light flux changes to become longer, a spherical aberration changes in the deficient correction direction.

Further, the second optical path difference providing structure of Example 2 is configured to be an optical path difference providing structure in which the third basic structure same with the first basic structure and the fourth basic structure same with the second basic structure are superimposed on each other on the entire region of the intermediate region. The stepped portions on the third basic structure face in the direction reverse to the direction going to the optical axis, and the stepped portions on the fourth basic structure face in the direction going to the optical axis. In the third basic structure, when the wavelength of an entering light flux changes to become longer, a spherical aberration changes in the excessive correction direction, and in the fourth basic structure, when the wavelength of an enering light flux changes to become longer, a spherical aberration changes in the deficient correction direction.

The third optical path difference providing structure of Example 2 consists of only the sixth basic structure. The sixth basic structure is a blaze type diffractive structure configured to make a light quantity of the second order diffracted light flux of the first light flux having passed through the sixth basic structure larger than a light quantity of any other order diffracted light flux, to make a light quantity of the first order diffracted light flux of the second light flux having passed through the sixth basic structure larger than a light quantity of any other order diffracted light flux, and to make a light quantity of the first order diffracted light flux of the third light flux having passed through the sixth basic structure larger than a light quantity of any other order diffracted light flux.

The lens data of Example 2 are shown in Table 2.

TABLE 2

[EXAMPLE 2]

| | | | | |
|---|---|---|---|---|
| FOCAL LENGTH OF OBJECTIVE LENS | $f_1 = 1.76$ mm | $f_2 = 2.00$ mm | $f_3 = 2.06$ mm | |
| NUMERICAL APERTURE | NA1: 0.85 | NA2: 0.60 | NA3: 0.47 | |
| MAGNIFICATION | m1: 0 | m2: 0 | m3: 0 | |

| i-TH SURFACE | ri | di(405 nm) | ni(405 nm) | di(660 nm) | ni(660 nm) | di(785 nm) | ni(785 nm) |
|---|---|---|---|---|---|---|---|
| 0 | ∞ | | | ∞ | | ∞ | |
| 1(STOP DIAMETER) | | 0.0(φ3.00 mm) | | 0.0(φ2.42 mm) | | 0.0(φ1.94 mm) | |
| 2-1 | 1.0995 | 2.000 | 1.5414 | 2.000 | 1.5225 | 2.000 | 1.5193 |
| 2-2 | 1.2190 | | | | | | |
| 2-3 | 1.1950 | | | | | | |
| 3 | −2.3056 | 0.618 | | 0.597 | | 0.292 | |
| 4 | ∞ | 0.0875 | 1.6196 | 0.600 | 1.5773 | 1.200 | 1.5709 |
| 5 | ∞ | | | | | | |

| | | SURFACE NO. | | | |
|---|---|---|---|---|---|
| | | 2-1 | 2-2 | 2-3 | 3 |
| | REGION | h ≤ 0.970 | 0.970 ≤ h ≤ 1.210 | 1.210 ≤ h ≤ 1.500 | |
| ASPHERIC SURFACE COEFFICIENT | κ | −9.1450E−01 | −3.3191E−01 | −6.1452E−01 | −2.8047E+01 |
| | A0 | 0.0000E+00 | 8.7311E−03 | 1.2848E−02 | 0.0000E+00 |
| | A4 | 1.0636E−02 | 2.7967E−02 | 2.9610E−02 | 1.9516E−01 |
| | A6 | 2.3302E−02 | −1.3432E−02 | −2.2112E−03 | −2.9699E−01 |
| | A8 | −3.3341E−03 | 3.9331E−03 | 1.1432E−02 | 3.6376E−01 |
| | A10 | −6.1156E−03 | −1.1253E−02 | −1.1268E−02 | −3.1454E−01 |
| | A12 | 3.5430E−03 | 4.6887E−03 | 2.7839E−03 | 1.6387E−01 |
| | A14 | 1.2157E−02 | 4.7695E−03 | 4.2516E−03 | −4.5644E−02 |
| | A16 | −2.2008E−02 | −6.3249E−03 | −4.5008E−03 | 5.1747E−03 |
| | A18 | 1.3650E−02 | 2.8901E−03 | 1.9120E−03 | 0.0000E+00 |
| | A20 | −2.8900E−03 | −5.4105E−04 | −3.0880E−04 | 0.0000E+00 |
| FIRST OPTICAL PATH DIFFERENCE FUNCTION | DIFFRACTION ORDER m | 1/1/1 | 1/1/1 | 2/1/1 | |
| | B2 | 1.1127E+02 | 1.0500E+02 | 2.7958E+00 | |
| | B4 | −1.1114E+01 | −8.3660E−01 | −1.1316E+00 | |
| | B6 | 7.0971E+00 | 1.7935E+00 | −1.1978E+00 | |
| | B8 | −2.3284E+00 | −1.5277E+00 | −2.7299E−01 | |
| | B10 | 9.3104E−02 | 6.7960E−01 | 6.2496E−02 | |
| SECOND OPTICAL PATH DIFFERENCE FUNCTION | DIFFRACTION ORDER m | 2/1/1 | 2/1/1 | — | |
| | B2 | −4.6255E+01 | −5.3484E+01 | — | |
| | B4 | −1.1985E+01 | −9.9028E−01 | — | |
| | B6 | 8.5980E+00 | 1.8768E+00 | — | |
| | B8 | −5.0163E+00 | −1.7387E+00 | — | |
| | B10 | 4.2074E−01 | 2.3012E−01 | — | |

According to the wavelength characteristic in the BD of Example 2, when the wavelength of the light source changes by +5 nm, the third order spherical aberration is −1 mλ rms, and the fifth order spherical aberration is 1 mλ rms.

The present invention should not be limited to the examples described in the specification, and it is clear for one of ordinary skill in the art in the present technical field from the examples and spirits described in the present specification that the present invention includes other examples and modified examples.

The descriptions and the examples in the specification are merely intended to show exemplification, and the scope of the present invention will be indicated by the claims mentioned later.

DESCRIPTION OF REFERENCE SYMBOLS

AC1 Biaxial actuator
BS Polarization beam splitter
CN Central region
COL Collimator lens
DP Dichroic prism
LD1 First semiconductor laser or blue-violet semiconductor laser
LD2 Second semiconductor laser
LD3 Third semiconductor laser
LDP Laser unit
MD Intermediate region
OL Objective lens
OT Peripheral region
PD Light receiving element
PL1 Protective substrate
PL2 Protective substrate
PL3 Protective substrate
PU1 Optical pickup apparatus
QWP λ/4 wavelength plate
RL1 Information recording surface
RL2 Information recording surface
RL3 Information recording surface
SEN Sensor lens

The invention claimed is:
1. An objective lens for use in an optical pickup apparatus which comprises a first light source for emitting a first light flux having a first wavelength λ1 (390 nm≤λ1≤415 nm), a second light source for emitting a second light flux having a second wavelength λ2 (630 nm≤λ2≤670 nm), and a third light source for emitting a third light flux having a third wavelength λ3 (760 nm≤λ3≤820 nm), and is configured to record and/or reproduce information for a BD including a protective substrate with a thickness t1 by using the first light flux, to record and/or reproduce information for a DVD including a protective substrate with a thickness t2 (t1<t2) by using the second light flux, and to record and/or reproduce information for a CD including a protective substrate with a thickness t3 (t2<t3) by using the third light flux; the objective lens being a single lens made of plastic, comprising:

an optical surface including at least a central region, an intermediate region surrounding the central region, and a peripheral region surrounding the intermediate region, wherein the central region includes a first optical path difference providing structure and the intermediate region includes a second optical path difference providing structure, wherein the objective lens is configured to converge the first light flux passing through the central region onto an information recording surface of the BD so as to enable to record and/or reproduce information, to converge the second light flux passing through the central region onto an information recording surface of the DVD so as to enable to record and/or reproduce information, and to converge the third light flux passing through the central region onto an information recording surface of the CD so as to enable to record and/or reproduce information; the objective lens is configured to converge the first light flux passing through the intermediate region onto the information recording surface of the BD so as to enable to record and/or reproduce information, to converge the second light flux passing through the intermediate region onto the information recording surface of the DVD so as to enable to record and/or reproduce information, and not to converge the third light flux passing through the intermediate region onto the information recording surface of the CD so as to enable to record and/or reproduce information; and the objective lens is configured to converge the first light flux passing through the peripheral region onto the information recording surface of the BD so as to enable to record and/or reproduce information, not to converge the second light flux passing through the peripheral region onto the information recording surface of the DVD so as to enable to record and/or reproduce information, and not to converge the third light flux passing through the peripheral region onto the information recording surface of the CD so as to enable to record and/or reproduce information, wherein the first optical path difference providing structure has a structure in which at least a first basic structure and a second basic structure are superimposed on each other, wherein the first basic structure is configured to make a light quantity of the first order diffracted light flux of the first light flux having passed through the first basic structure larger than a light quantity of any other order diffracted light flux, to make a light quantity of the first order diffracted light flux of the second light flux having passed through the first basic structure larger than a light quantity of any other order diffracted light flux, and to make a light quantity of the first order diffracted light flux of the third light flux having passed through the first basic structure larger than a light quantity of any other order diffracted light flux, and the first basic structure is a blaze type structure, wherein the second basic structure is configured to make a light quantity of the second order diffracted light flux of the first light flux having passed through the second basic structure larger than a light quantity of any other order diffracted light flux, to make a light quantity of the first order diffracted light flux of the second light flux having passed through the second basic structure larger than a light quantity of any other order diffracted light flux, and to make a light quantity of the first order diffracted light flux of the third light flux having passed through the second basic structure larger than a light quantity of any other order diffracted light flux, and the second basic structure is a blaze type structure, and wherein in the first basic structure, when a wavelength of an entering light flux changes to become longer, a spherical aberration changes in a deficient correction direction, and in the second basic structure, when a wavelength of an entering light flux changes to become longer, a spherical aberration changes in a deficient correction direction.

2. The objective lens described in claim 1, wherein stepped portions of at least a part of the first basic structure arranged in the vicinity of an optical axis on the central region face in a direction reverse to a direction going to the optical axis, and stepped portions of at least a part of the second basic structure arranged in the vicinity of an optical axis on the central region face in a direction going to the optical axis.

3. The objective lens described in claim 1, wherein the second optical path difference providing structure has a structure in which at least a third basic structure and a fourth basic structure are superimposed on each other, wherein the third basic structure is configured to make a light quantity of the first order diffracted light flux of the first light flux having passed through the third basic structure larger than a light quantity of any other order diffracted light flux, and to make a light quantity of the first order diffracted light flux of the second light flux having passed through the third basic structure larger than a light quantity of any other order diffracted light flux, and the third basic structure is a blaze type structure, and wherein the fourth basic structure is configured to make a light quantity of the second order diffracted light flux of the first light flux having passed through the fourth basic structure larger than a light quantity of any other order diffracted light flux, and to make a light quantity of the first order diffracted light flux of the second light flux having passed through the fourth basic structure larger than a light quantity of any other order diffracted light flux, and the fourth basic structure is a blaze type structure.

4. The objective lens described in claim 1, wherein the second optical path difference providing structure has a structure in which at least a third basic structure and a fourth basic structure are superimposed on each other, wherein the third basic structure is configured to make a light quantity of the third order diffracted light flux of the first light flux having passed through the third basic structure larger than a light quantity of any other order diffracted light flux, and to make a light quantity of the second order diffracted light flux of the second light flux having passed through the third basic structure larger than a light quantity of any other order diffracted light flux, and the third basic structure is a blaze type structure, and wherein the fourth basic structure is configured to make a light quantity of the second order diffracted light flux of the first light flux having passed through the fourth basic structure larger than a light quantity of any other order diffracted light flux, and to make a light quantity of the first order diffracted light flux of the second light flux having passed through the fourth basic structure larger than a light quantity of any other order diffracted light flux, and the fourth basic structure is a blaze type structure.

5. The objective lens described in claim 3, wherein stepped portions of at least a part of the third basic structure arranged in the vicinity of a boundary between the central region and the intermediate region on the intermediate region face in a direction reverse to a direction going to the optical axis, and stepped portions of at least a part of the fourth basic structure arranged in the vicinity of a boundary between the central region and the intermediate region on the intermediate region face in a direction going to the optical axis.

6. The objective lens described in claim 3, wherein in the third basic structure, when a wavelength of an entering light flux changes to become longer, a spherical aberration changes in a deficient correction direction, and in the fourth basic structure, when a wavelength of an entering light flux changes to become longer, a spherical aberration changes in a deficient correction direction.

7. The objective lens described in claim 3, wherein in one of the third basic structure and the fourth basic structure, when a wavelength of an entering light flux changes to become longer, a spherical aberration changes in a deficient correction direction, and in the other one, when a wavelength of an entering light flux changes to become longer, a spherical aberration changes in an excessive correction direction.

8. The objective lens described in claim 7, wherein at the time of converging the first light flux onto the information recording surface of the BD, when the wavelength of the first light flux changes by +5 nm, an amount of a change of the third order spherical aberration is −30 m$\lambda$ rms or more and +50 m$\lambda$ rms or less.

9. The objective lens described in claim 1, wherein the following expression is satisfied, $0.8 \leq d/f1 \leq 1.5$ where d represents a thickness (mm) of the objective lens on the optical axis, and f1 represents a focal length (mm) of the objective lens for the first light flux.

10. The objective lens described in claim 1, wherein the central region includes only the first optical path difference providing structure in which only the first basic structure and the second basic structure are superimposed on each other, and the intermediate region includes only the second optical path difference providing structure in which only the third basic structure and the fourth basic structure are superimposed on each other.

11. An optical pickup apparatus includes the objective lens described in claim 1.

12. The optical pickup apparatus described in claim 11, wherein the second optical path difference providing structure has a structure in which at least a third basic structure and a fourth basic structure are superimposed on each other, wherein in one of the third basic structure and the fourth basic structure, when a wavelength of an entering light flux changes to become longer, a spherical aberration changes in a deficient correction direction, and in the other one, when a wavelength of an entering light flux changes to become longer, a spherical aberration changes in an excessive correction direction, wherein the optical pickup apparatus includes a coupling lens through which at least the first light flux and the second light flux are configured to pass, and an actuator to move the coupling lens in the optical axis direction, and wherein when the first light flux passes through, the coupling lens is configured to be movable in the optical axis direction by the actuator, and when the second light flux passes through, the position of the coupling lens in the optical axis direction is fixed.

13. An optical information recording reproducing apparatus is configured to include the optical pickup apparatus described in claim 11.

* * * * *